US012576995B1

(12) United States Patent
Alatorre et al.

(10) Patent No.: US 12,576,995 B1
(45) Date of Patent: Mar. 17, 2026

(54) SYSTEMS AND METHODS FOR PROVIDING A HYBRID GRAVITY ENVIRONMENT

(71) Applicant: Above Space Development Corporation, Huntsville, AL (US)

(72) Inventors: Tim Alatorre, Huntsville, AL (US); Thomas R. Spilker, Monrovia, CA (US); Jeffery Buyers Greenblatt, Astoria, OR (US)

(73) Assignee: Above Space Development Corporation, Huntsville, AL (US)

( * ) Notice: Subject to any disclaimer, the term of this patent is extended or adjusted under 35 U.S.C. 154(b) by 0 days.

(21) Appl. No.: 19/219,560

(22) Filed: May 27, 2025

(51) Int. Cl.
*B64G 1/46* (2006.01)

(52) U.S. Cl.
CPC ................................... *B64G 1/465* (2023.08)

(58) Field of Classification Search
CPC ...................................................... B64G 1/465
See application file for complete search history.

(56) References Cited

U.S. PATENT DOCUMENTS

| | | | | |
|---|---|---|---|---|
| 3,144,219 | A * | 8/1964 | Schnitzer ................. | B64G 1/16 |
| | | | | 244/158.3 |
| 3,300,162 | A | 1/1967 | Maynard et al. | |
| 3,749,332 | A | 7/1973 | Gray | |
| 4,730,797 | A | 3/1988 | Minovitch | |

| | | | | |
|---|---|---|---|---|
| 6,206,328 | B1 * | 3/2001 | Taylor ..................... | B64G 1/12 |
| | | | | 244/159.6 |
| 9,994,338 | B2 | 6/2018 | Dharmaraj et al. | |
| 10,081,444 | B2 * | 9/2018 | Dharmaraj .............. | B64G 1/12 |
| 2017/0240302 | A1 * | 8/2017 | Dharmaraj .............. | B64G 1/42 |
| 2017/0240303 | A1 | 8/2017 | Dharmaraj | |
| 2017/0361950 | A1 | 12/2017 | Dharmaraj | |
| 2018/0099766 | A1 | 4/2018 | Dharmaraj et al. | |
| 2018/0370661 | A1 | 12/2018 | Dharmaraj et al. | |
| 2021/0387749 | A1 * | 12/2021 | Bloxton ................... | B64G 1/64 |

OTHER PUBLICATIONS

Deep space nice space station schematics https://www.cygnus-x1.net/links/lcars/blueprints/deep-space-nine-concept-sheet-1.jpg 1993.*

* cited by examiner

*Primary Examiner* — Justin M Benedik

(74) *Attorney, Agent, or Firm* — Finnegan, Henderson, Farabow, Garrett & Dunner, LLP

(57) ABSTRACT

The present disclosure provides an apparatus comprising a first outer ring module and a second outer ring module configured to produce artificial gravity environments when revolved about a rotational axis. At least one circumferential access tube may connect the first and second outer ring modules. A central hub may be connected to the first and second outer ring modules via first and second radial access tubes, respectively. A microgravity module may be located coaxial with the rotational axis and connected to the central hub via a rotary union. The apparatus may enable simultaneous provision of artificial gravity and microgravity environments within a single space vehicle structure, allowing for diverse research, manufacturing, and habitation capabilities in space.

22 Claims, 15 Drawing Sheets

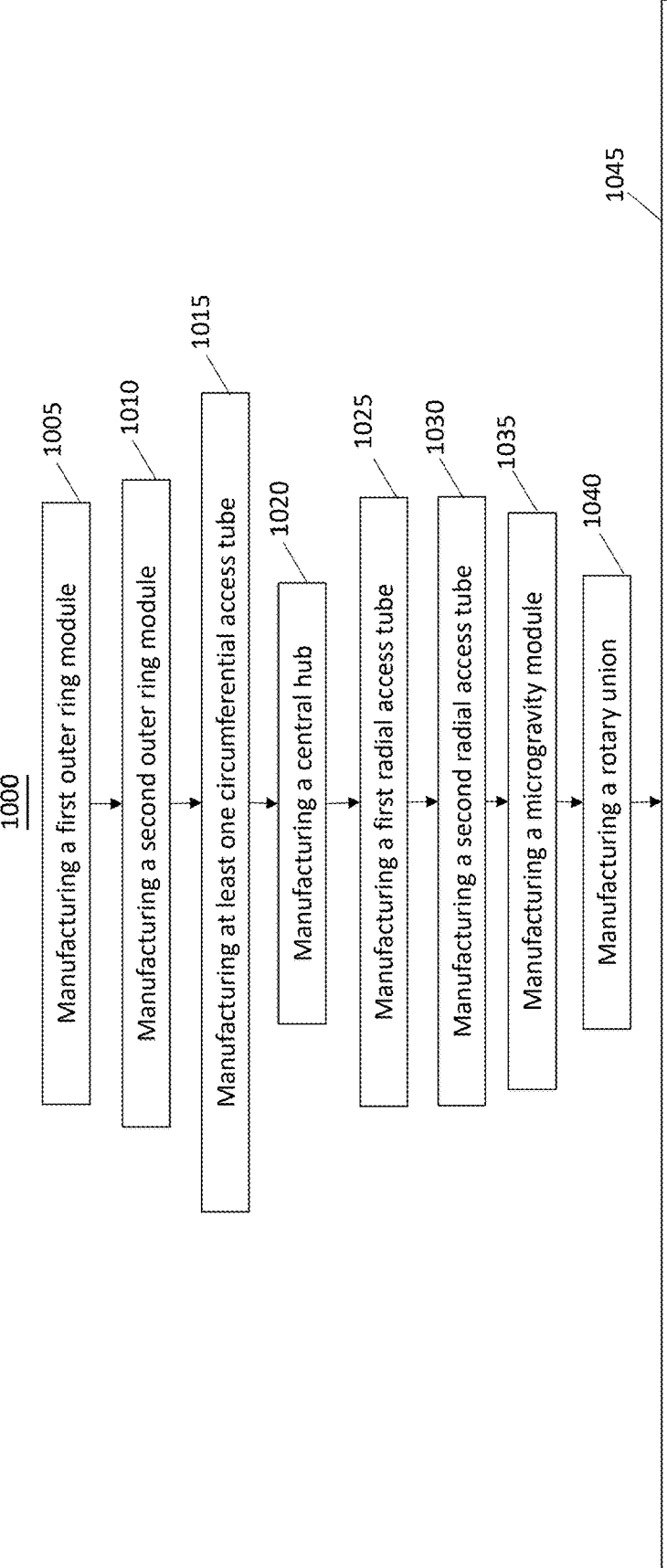

1000

1005 Manufacturing a first outer ring module

1010 Manufacturing a second outer ring module

1015 Manufacturing at least one circumferential access tube

1020 Manufacturing a central hub

1025 Manufacturing a first radial access tube

1030 Manufacturing a second radial access tube

1035 Manufacturing a microgravity module

1040 Manufacturing a rotary union

1045 Placing the first outer ring module, the second outer ring module, the at least one circumferential access tube, the central hub, the first radial access tube, the second radial access tube, the microgravity module, and the rotary union on a vehicle capable of entering outer space

*Fig. 10*

SYSTEMS AND METHODS FOR PROVIDING A HYBRID GRAVITY ENVIRONMENT

FIELD

The present disclosure relates to space vehicles, and more particularly to a space vehicle configured to provide a hybrid gravity environment with both artificial gravity and microgravity capabilities.

BACKGROUND

Space exploration and long-duration space missions have been a focus of scientific and technological advancement for decades. As humans venture further into space and contemplate extended stays on other celestial bodies, the challenges associated with prolonged exposure to microgravity environments become increasingly apparent. For example, microgravity conditions can have numerous adverse effects on human physiology, including bone density loss, muscle atrophy, cardiovascular deconditioning, and changes in fluid distribution within the body. These physiological changes can potentially impact astronaut health and performance during extended space missions.

Researchers and engineers have explored various approaches to mitigate the effects of microgravity on the human body. One concept that has garnered attention is the creation of artificial gravity environments in space. By simulating Earth-like gravitational forces, it may be possible to reduce or prevent some of the negative physiological effects associated with prolonged exposure to microgravity. Several theoretical designs for space habitats incorporating artificial gravity have been proposed over the years. These concepts often involve rotating structures that utilize centrifugal force to create a gravity-like effect. However, implementing such designs in practice presents numerous engineering challenges, including structural integrity, stability, and the integration of various spacecraft systems.

Additionally, the ability to provide different gravitational environments within a single space structure could offer advantages for scientific research and space manufacturing processes. Some experiments or manufacturing techniques may benefit from microgravity conditions, while others may require Earth-like gravity or partial gravity environments similar to those found on the Moon or Mars. The development of space habitats that can provide multiple gravity environments presents complex design considerations. These include managing the transition between different gravity zones, ensuring structural stability during rotation, and accommodating the various needs of crew members and scientific payloads.

The embodiments disclosed herein address these challenges by using hybrid gravity environments that simultaneously enable sustainable human presence in Earth orbit and beyond and allow for a variety of gravity environments to enable research and manufacturing processes.

SUMMARY

The disclosed embodiments describe systems, methods, and devices for a space vehicle configured to provide hybrid gravity environments. These systems, methods, and devices may include an apparatus that may include a central hub located on a rotational axis, a microgravity module configured to be located coaxial with the rotational axis, a rotary union configured to connect the microgravity module to the central hub, a first outer ring of modules configured to produce a first artificial gravity environment having a first artificial gravity magnitude when revolved about a rotational axis, at least one radial access tube configured to connect the central hub to the first outer ring of modules, a second outer ring of modules configured to produce a second artificial gravity environment having a second artificial gravity magnitude when revolved about a rotational axis, at least one radial access tube configured to connect the first outer ring of modules to the second outer ring of modules, at least one circumferential access tube configured to connect a first outer ring module to an adjacent first outer ring module, and at least one circumferential access tube configured to connect a second outer ring module to an adjacent second outer ring module.

According to disclosed embodiments, the apparatus may further include a gyroscope configured to extend from the central hub, wherein the gyroscope may include a crosspiece with a first weighted end and a second weighted end.

According to disclosed embodiments, the first outer ring module may include a first weight located on a first edge of the first outer ring module and a second weight located on a second edge of the first outer ring module, and wherein the second outer ring module may include a third weight located on a first edge of the second outer ring module and a fourth weight located on a second edge of the second outer ring module.

According to disclosed embodiments, a third outer ring module may be configured to produce a third artificial gravity environment having a third artificial gravity magnitude when revolved about the rotational axis.

According to disclosed embodiments, the first outer ring module and the second outer ring module may each be configured to produce an interior volume of 0.025 to 10,000 $m^3$.

According to disclosed embodiments, each of the first outer ring module and the second outer ring module may be configured to be located 0.5 meters to 5,000 meters from the central hub.

According to disclosed embodiments, the first artificial gravity magnitude and the second artificial gravity magnitude may be between about 0.01 g and about 10 g.

According to disclosed embodiments, the first artificial gravity magnitude and the second artificial gravity magnitude may be about 0.166 g.

According to disclosed embodiments, the first radial access tube and the second radial access tube may have an internal diameter of 0.001 to 10 meters.

According to disclosed embodiments, the at least one circumferential access tube may have an internal diameter of 0.001 meters to 10 meters.

According to disclosed embodiments, the apparatus may further include a fluid pumping system. The fluid pumping system may include one or more fluid reservoirs, one or more pumps, one or more automated sensors, and one or more response systems, and wherein the fluid pumping system is configured to move a fluid between the first outer ring module and the second outer ring module to align a center of mass of the apparatus with the rotational axis.

According to disclosed embodiments, the rotary union may include a stator configured to connect to the microgravity module, a rotor configured to connect to the central hub, and a primary seal configured to maintain the module and hub pressurization while minimizing rotational friction between the microgravity module and the central hub. The seal may include at least one of: a compliant polymer material, an organic material, an inorganic material, a metallic material, or a ceramic material, a secondary seal, and a bearing, which may include at least one of: a mechanical bearing, a magnetic bearing, an air bearing, or a pumped fluid bearing.

According to disclosed embodiments, the rotary union may further include a thrust bearing configured to support axial forces in the rotary union.

According to disclosed embodiments, the apparatus may further include a parallel section configured to connect along the rotational axis with the central hub through a second rotary union. The parallel section may include a third outer ring module configured to produce a third artificial gravity environment having a third artificial gravity magnitude when revolved about the rotational axis, a fourth outer ring module configured to produce a fourth artificial gravity environment having a fourth artificial gravity magnitude equivalent to the third artificial gravity magnitude when revolved about the rotational axis, at least one secondary circumferential access tube configured to connect the third outer ring module to the fourth outer ring module, a second central hub configured to connect to the central hub through the second rotary union, a third radial access tube configured to connect the second central hub to the third outer ring module, and a fourth radial access tube configured to connect the second central hub to the fourth outer ring module.

Aspects of the present disclosure may further include an apparatus that may include a first module configured to produce a first artificial gravity environment having a first artificial gravity magnitude when revolved about a rotational axis. The first module may include a first plurality of payload compartments configured to contain a first plurality of payloads. The first plurality of payload compartments may include a first mounting rail configured to secure the first plurality of payloads, a first power connection, a first data connection, and a first port located on an external surface of the first module, the first port configured to allow at least one of the first plurality of payloads access to an outside environment. The apparatus may also include a second module configured to produce a second artificial gravity environment having a second artificial gravity magnitude equivalent to the first artificial gravity magnitude when revolved about the rotational axis. The second module may include a second plurality of payload compartments configured to contain a second plurality of payloads. The second plurality of payload compartments may include a second mounting rail configured to secure the second plurality of payloads, a second power connection, a second data connection, and a second port located on an external surface of the second module, the second port configured to allow at least one of the second plurality of payloads access to the outside environment. The apparatus may further include a radial tube configured to connect the first module to the second module, a power system configured to provide power to the first module via the first power connection and configured to provide power to the second module via the second power connection, an on-platform communications system configured to provide data transmission and control for the first plurality of payloads via the first data connection and configured to provide data transmission and control for the second plurality of payloads via the second data connection, and a thermal control system configured to provide thermal energy transfer to the first module and the second module.

According to disclosed embodiments, the first module and the second module may each be configured to produce a volume of about 0.001 m³ to about 1,000 m³. According to disclosed embodiments, the first module and the second module may be configured to be unpressurized.

According to disclosed embodiments, the first module and the second module may be configured to be pressurized.

According to disclosed embodiments, the first artificial gravity gradient may be configured to increase based on a distance from the rotational axis.

According to disclosed embodiments, a first artificial gravity magnitude at an outer edge of the first module may be configured to be greater than a second artificial gravity magnitude at an inner edge of the first module.

According to disclosed embodiments, the second artificial gravity magnitude may be configured to be approximately seventy percent of the first artificial gravity magnitude.

According to disclosed embodiments, the first artificial gravity magnitude may be configured to be between 0.006 g and 0.180 g.

According to disclosed embodiments, the second artificial gravity magnitude may be configured to be between 0.004 g and 0.12 g.

Aspects of the present disclosure may further include an apparatus that may include a circular inner section that may include a first inner ring module configured to produce a first artificial gravity environment having a first artificial gravity magnitude when revolved about a rotational axis, a second inner ring module configured to produce a second artificial gravity environment having a second artificial gravity magnitude equivalent to the first artificial gravity magnitude when revolved about the rotational axis, and at least one inner circumferential access tube configured to connect the first inner ring module to the second inner ring module. The apparatus may further include a circular outer section configured to be concentric with the circular inner section. The circular outer section may include a first outer ring module configured to produce a third artificial gravity environment having a third artificial gravity magnitude when revolved about the rotational axis, a second outer ring module configured to produce a fourth artificial gravity environment having a fourth artificial gravity magnitude equivalent to the third artificial gravity magnitude when revolved about the rotational axis, and at least one outer circumferential access tube configured to connect the first outer ring module to the second outer ring module. The apparatus may further include a first outer radial access tube configured to connect the first inner ring module to the first outer ring module, a second outer radial access tube configured to connect the second inner ring module to the second outer ring module, a central hub, a first inner radial access tube configured to connect the central hub to the first inner ring module, a second inner radial access tube configured to connect the central hub to the second inner ring module, a microgravity module configured to be located coaxial with the rotational axis, and a rotary union configured to connect the microgravity module to the central hub.

According to disclosed embodiments, a rate of revolution of the inner section may be configured to be equal to a rate of revolution of the outer section.

According to disclosed embodiments, a radius of the circular inner section may be configured to be less than a radius of the circular outer section.

According to disclosed embodiments, the first artificial gravity magnitude may be less than the third artificial gravity magnitude.

According to disclosed embodiments, the rotary union may further include at least one selected from the group of: a motor integrated with the rotary union, a motor outside the rotary union, or propellant based engines.

According to disclosed embodiments, the first inner ring module, the second inner ring module, the first outer ring module, and the second outer ring module may be configured to be pressurized.

According to disclosed embodiments, the first inner ring module, the second inner ring module, the first outer ring module, and the second outer ring module may be configured to be non-pressurized.

According to disclosed embodiments, the apparatus may further include a parallel section configured to connect along the rotational axis with the central hub through a second rotary union. The parallel section may include a first parallel ring module configured to produce a fifth artificial gravity environment having a fifth artificial gravity magnitude when revolved about the rotational axis, a second parallel ring module configured to produce a sixth artificial gravity environment having a sixth artificial gravity magnitude when revolved about the rotational axis, at least one circumferential access tube configured to connect the first parallel ring module to the second parallel ring module, a second central hub configured to connect to the central hub through the second rotary union, a first parallel radial access tube configured to connect the second central hub to the first parallel ring module, and a second parallel radial access tube configured to connect the second central hub to the second parallel ring module.

Aspects of the present disclosure may further include a method that may include manufacturing a first outer ring module configured to produce a first artificial gravity environment having a first artificial gravity magnitude when revolved about a rotational axis, manufacturing a second outer ring module configured to produce a second artificial gravity environment having a second artificial gravity magnitude equivalent to the first artificial gravity magnitude when revolved about the rotational axis, manufacturing at least one circumferential access tube configured to connect the first outer ring module to the second outer ring module, manufacturing a central hub, manufacturing a first radial access tube configured to connect the central hub to the first outer ring module, manufacturing a second radial access tube configured to connect the central hub to the second outer ring module, manufacturing a microgravity module configured to be located tangential to the rotational axis, manufacturing a rotary union configured to connect the microgravity module to the central hub, and placing the first outer ring module, the second outer ring module, the at least one circumferential access tube, the central hub, the first radial access tube, the second radial access tube, the microgravity module, and the rotary union on a vehicle capable of entering outer space.

According to disclosed embodiments, the first outer ring module, the second outer ring module, the at least one circumferential access tube, the central hub, the first radial access tube, the second radial access tube, and the microgravity module may include an inflatable sheet tube.

Aspects of the present disclosure may further include an apparatus that may include a first outer ring module configured to revolve about a rotational axis, a second outer ring module configured to revolve about the rotational axis, a central hub, a first radial access tube configured to connect the first outer ring module to the central hub, and a second radial access tube configured to connect the second outer ring module to the central hub.

According to disclosed embodiments, the apparatus may further include a microgravity module configured to be located coaxial with the rotational axis and a rotary union configured to connect the central hub to the microgravity module.

According to disclosed embodiments, the apparatus may further include a microgravity module configured to be rigidly connected to the central hub.

According to disclosed embodiments, revolving the first outer ring module and the second outer ring module may be configured to produce an artificial gravity environment having an artificial gravity magnitude.

According to disclosed embodiments, the apparatus may further include a third outer ring module configured to revolve about the rotational axis; a fourth outer ring module configured to revolve about the rotational axis, a third radial access tube configured to connect the first outer ring module to the third outer ring module, and a fourth radial access tube configured to connect the second outer ring module to the fourth outer ring module.

According to disclosed embodiments, a distance between the third outer ring module and the central hub may be greater than a distance between the first outer ring module and the central hub.

According to disclosed embodiments, the apparatus may further include a docking station configured to be located coaxial with the rotational axis.

According to disclosed embodiments, the apparatus may further include a fluid pumping system configured to align the first outer ring module and the second outer ring module.

According to disclosed embodiments, the apparatus may further include micrometeoroid and orbital debris protection.

According to disclosed embodiments, the apparatus may further include steerable communication antennas configured to be mounted on at least one of the first outer ring module and the second outer ring module.

According to disclosed embodiments, the apparatus may further include a propulsion system configured to be located on at least one of the first outer ring module and the second outer ring module.

According to disclosed embodiments, the apparatus may further include a plurality of steerable photovoltaic cells.

Aspects of the present disclosure may further include a method that may include manufacturing a first outer ring module configured to revolve about a rotational axis; manufacturing a second outer ring module configured to revolve about the rotational axis; manufacturing a central hub; manufacturing a first radial access tube configured to connect the first outer ring module to the central hub; manufacturing a second radial access tube configured to connect the second outer ring module to the central hub; and placing the first outer ring module, the second outer ring module, the central hub, the first radial access tube, and the second radial access tube on a vehicle capable of entering outer space.

According to disclosed embodiments, the method may further include manufacturing a microgravity module configured to be located coaxial with the rotational axis, manufacturing a rotary union configured to connect the central hub to the microgravity module, and placing the microgravity module and the rotary union on the vehicle.

According to disclosed embodiments, the microgravity module may be configured to produce a microgravity environment.

According to disclosed embodiments, the first outer ring module may be configured to produce a first artificial gravity environment having a first artificial gravity magnitude when revolved about a rotational axis and the second outer ring module may be configured to produce a second artificial gravity environment having a second artificial gravity magnitude equivalent to the first artificial gravity magnitude when revolved about the rotational axis.

Aspects of the present disclosure may include an apparatus that may include a first outer ring module configured to produce a first artificial gravity environment having a first artificial gravity magnitude when revolved about a rotational axis, a second outer ring module configured to produce a second artificial gravity environment having a second artificial gravity magnitude equivalent to the first artificial gravity magnitude when revolved about the rotational axis, a third outer ring module configured to produce a third artificial gravity environment having a third artificial gravity magnitude equal to the first artificial gravity magnitude when revolved about the rotational axis, a first circumferential access tube configured to connect the first outer ring module to the second outer ring module, a second circumferential access tube configured to connect the second outer ring module to the third outer ring module, and a third circumferential access tube configured to connect the third outer ring module to the first outer ring module.

According to disclosed embodiments, the first outer ring module, the second outer ring module, and the third outer ring module may include a rigid material.

According to disclosed embodiments, the first outer ring module, the second outer ring module, and the third outer ring module may include a stiffened inflatable material.

According to disclosed embodiments, the first outer ring module, the second outer ring module, and the third outer ring module may be configured to inflate.

Aspects of the present disclosure may further include an apparatus that may include a platform having a center of mass and an enclosure configured to extend radially away from the platform. The enclosure may be configured to create an open internal volume and configured to produce an artificial gravity environment having an artificial gravity magnitude when revolved about the center of mass.

It is to be understood that both the foregoing general description and the following detailed description are examples and explanatory only and are not restrictive of the disclosed embodiments.

BRIEF DESCRIPTION OF FIGURES

The accompanying drawings constitute a part of this specification. The drawings illustrate several embodiments of the present disclosure and, together with the description, serve to explain the principles of the disclosed embodiments as set forth in the accompanying claims.

FIG. 10 depicts a flowchart for a method of manufacturing a space vehicle, according to aspects of the present disclosure.

DETAILED DESCRIPTION

The following description sets forth exemplary aspects of the present disclosure. It should be recognized, however, that such description is not intended as a limitation on the scope of the present disclosure. Rather, the description also encompasses combinations and modifications to those exemplary aspects described herein.

Examples of embodiments of the present disclosure are described with reference to the accompanying drawings. In the figures, which are not necessarily drawn to scale, wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items or meant to be limited to only the listed item or items. It should also be noted that as used in the present disclosure and in the appended claims, the singular forms "a," "an," and "the" include plural references unless the context clearly dictates otherwise.

The disclosed embodiments overcome the technical problems disclosure herein by providing a hybrid gravity environment that combines artificial gravity and microgravity capabilities within a single structure. For example, the disclosed embodiments may allow for simultaneous operation of various gravity-dependent and microgravity-sensitive activities, which may improve astronaut health and expand research capabilities during space missions. The modular and flexible configurations disclosed herein, which may feature interconnected ring modules and a central microgravity area, enable efficient use of space and adaptability for different mission requirements. Additionally, the ability to create gravity gradients and adjust artificial gravity levels provides unique opportunities for scientific experiments and space manufacturing processes. Overall, the disclosed embodiments represent a significant advancement in space habitat design, which may address key challenges in human spaceflight while offering versatile platforms for scientific research and commercial applications in space.

Figure 1:
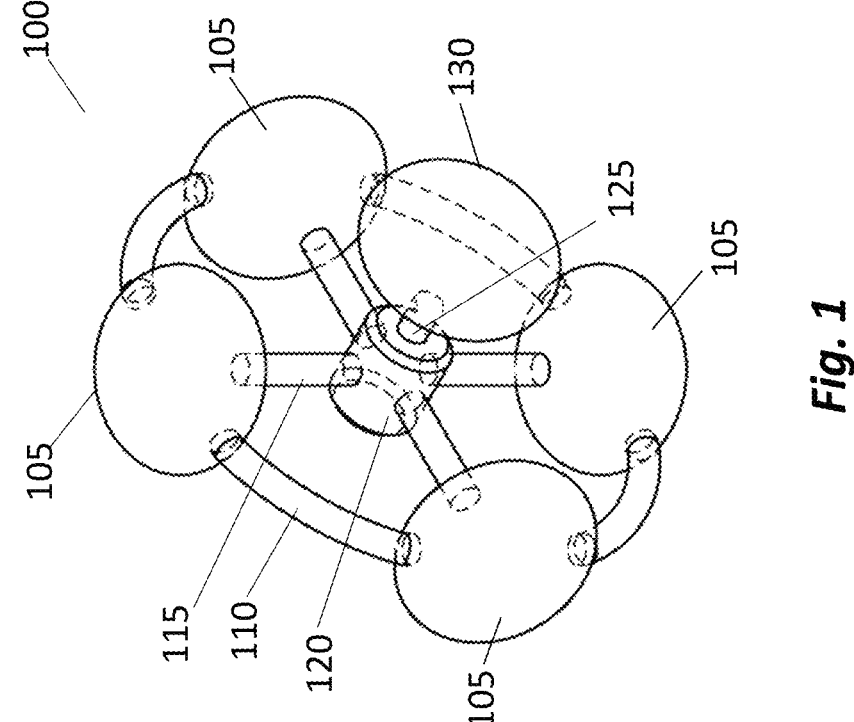
FIG. 1 depicts an isometric view of a space vehicle configured to provide a hybrid gravity environment, according to aspects of the present disclosure.

FIG. 1 depicts a space vehicle 100 configured to provide a hybrid gravity environment. A hybrid gravity environment may be an environment that provides multiple gravity conditions in different sections or areas of the same integrated structure. For example, space vehicle 100 may include modules or spaces that may be configured to provide microgravity or artificial gravity environments. A hybrid gravity environment may further include modules configured to provide variable levels of gravity. Such hybrid gravity environments may allow for diverse research, manufacturing, and habitation capabilities, addressing both the need for Earth-like gravity to mitigate the physiological effects of long-duration spaceflight and the requirement for microgravity conditions in certain scientific experiments and industrial processes. The space vehicle 100 may include a plurality of outer ring modules 105, a plurality of circumferential access tubes 110, a plurality of radial access tubes 115, a central hub 120, a rotary union 125, and a microgravity module 130.

The outer ring modules 105 may be arranged in a circular configuration around a central axis of the space vehicle 100. Although FIG. 1 depicts space vehicle 100 with four outer ring modules 105, space vehicle 100 may include any suitable number of outer ring modules 105. The outer ring modules 105 may be configured to produce artificial gravity environments having artificial gravity magnitudes when revolved around the rotational axis of space vehicle 100. In some implementations, the outer ring modules 105 may have modular interiors with customizable layouts to accommodate different mission needs such as living quarters, research laboratories, or manufacturing facilities. In some embodiments, outer ring modules 105 may be configured to produce an interior volume between 0.025 cubic meters and 10,000 cubic meters. The size of each outer ring module 105 may be configured to be the same or may be configured to be different. In some embodiments, outer ring modules 105 may be configured to be located between 0.5 meters and 5,000 meters from central hub 120. The distance between outer ring modules 105 and central hub 120 may be determined based on mission-specific needs. For example, the distance between outer ring modules 105 and central hub 120 may be determined based on the level of artificial gravity that is required to be produced when space vehicle 100 is deployed in space. In some embodiments, space vehicle 100 may be configured to create a level of artificial gravity in outer ring modules 105 between about 0.01 g and about 10 g. For example, in some embodiments, the level of artificial gravity in outer ring modules 105 may be 0.166 g. Some embodiments may be configured to maintain an artificial gravity level within a set range, which may be maintained by rotational speed and/or component sizes. The set range may be configured based on a level of acceptable safety with a margin for allowable speed adjustments based on safety, technological feasibility, or equipment purpose, such as impact on lab equipment.

In some embodiments, the outer ring modules 105 may include pressurized habitable spaces designed for long-duration human occupancy in space. The outer ring modules 105 may be equipped with life support systems, crew quarters, research laboratories, and other facilities. The outer ring modules 105 may also incorporate radiation shielding materials and micrometeoroid protection layers to ensure crew safety during extended space missions. In some embodiments, the outer ring modules 105 may include specialized manufacturing facilities for in-space production of materials that benefit from artificial gravity conditions. The outer ring modules 105 may also house centrifuges or other scientific equipment that requires a controlled gravity environment for experiments in fields such as biology, physics, or materials science.

In some embodiments, outer ring modules 105 may be configured to produce a first artificial gravity environment. In some embodiments, the first artificial gravity environment may include a controlled centrifugal force field generated by the rotation of the outer ring modules 105 around the rotational axis of space vehicle 100. The artificial gravity environment may be designed to simulate gravitational conditions ranging from lunar gravity (0.16 g) to Earth-normal gravity (1 g), utilizing precision angular velocity control systems. Additional gravitational conditions, such as stronger or weaker gravities, may be simulated for testing or habitation purposes. The artificial gravity environment may be fine-tuned using active mass balancing techniques and vibration isolation systems to ensure a stable and uniform gravitational environment throughout the habitable volume of the outer ring module 105.

The outer ring modules 105 may have a first artificial gravity magnitude when revolved around a rotational axis. In some embodiments, the first artificial gravity magnitude may be created by generating a centripetal acceleration that simulates gravitational force within the outer ring module 105. This artificial gravity magnitude may be precisely controlled by adjusting the angular velocity of rotation and the radius of the outer ring module 105 from the rotational axis of space vehicle 100, utilizing advanced flywheel systems and electromagnetic bearings. The artificial gravity environment may be calibrated to produce specific g-forces, ranging from partial gravity conditions to Earth-normal gravity. In some embodiments, each of outer ring modules 105 may have an equivalent artificial gravity magnitude. In other embodiments, each outer ring module 105 may have varying artificial gravity magnitudes.

In some embodiments, the outer ring modules 105 of space vehicle 100 may include both pressurized and unpressurized modules. A pressurized outer ring module 105 may be designed to house sensitive scientific instruments, biological experiments, or delicate manufacturing processes that require a controlled atmospheric environment. Further, a pressurized outer ring module 105 may be designed to provide a habitable volume for crew members, featuring a robust pressure vessel constructed from high-strength aluminum alloys or advanced composites, capable of maintaining Earth-like atmospheric conditions or atmospheric conditions suitable for human habitation. A pressurized outer ring module 105 may include environmental control and life support systems (ECLSS) to maintain atmospheric pressure, temperature, and composition suitable for human occupancy. It may be equipped with radiation shielding, micrometeoroid protection, and emergency systems such as fire suppression and rapid depressurization mitigation. The pressurized outer ring module 105 may also include hermetically sealed feed-throughs for power, data, and fluid connections, as well as automated sample handling systems for conducting experiments without human intervention.

An unpressurized outer ring module 105 may be utilized for components and payloads that can operate in the vacuum of space. Unpressurized outer ring modules 105 may be constructed using an open truss structure or honeycomb panels to minimize mass while providing structural support and thermal stability. Unpressurized outer ring modules 105 may incorporate passive thermal control elements like multi-layer insulation (MLI) blankets and radiator panels to manage the extreme temperature variations in space. The unpressurized outer ring module 105 may feature standardized payload attachment points, allowing for easy integration and potential on-orbit servicing of various scientific or technological demonstration payloads.

Both pressurized and unpressurized outer ring modules 105 may be equipped with micrometeoroid and orbital debris (MMOD) protection systems, and may utilize common interfaces for power distribution, data handling, and attitude control to ensure seamless integration with the overall space vehicle architecture. Pressurized and unpressurized outer ring modules 105 may be interconnected by airlocks or pressurized passageways to allow for crew and cargo transfer, with the capability to isolate sections in case of emergencies. This dual-module approach enables the space vehicle 100 to efficiently accommodate a wide range of mission requirements within its hybrid gravity environments.

In some embodiments, the outer ring modules 105 may be connected to each other via circumferential access tubes 110, which may allow movement between adjacent outer ring modules 105. In some embodiments, circumferential access tubes 110 may be configured to have an internal diameter of about 0.001 meters to about 10 meters. In some embodiments, the circumferential access tubes 110 may include a pressurized passageway designed to facilitate crew and cargo movement between adjacent outer ring modules 105 while maintaining a controlled environment. The circumferential access tubes 110 may be constructed using flexible, multi-layered materials incorporating pressure vessels, thermal insulation, and micrometeoroid shielding. The circumferential access tubes 110 may also incorporate active vibration damping systems and articulated joints to accommodate minor structural deformations and maintain alignment during rotation, ensuring safe and efficient transit between outer ring modules 105 in space vehicle 100. The circumferential access tubes 110 may be equipped with emergency airlocks at regular intervals to provide safety measures in case of depressurization events. In some aspects, the circumferential access tubes 110 may incorporate guide rails or assisted movement systems to facilitate easy transit between outer ring modules 105 in varying gravity conditions.

Space vehicle 100 may further include radial access tubes 115. The radial access tubes 115 may extend from the central hub 120 to the outer ring modules 105, providing a means of transit between these components. In some embodiments, the radial access tubes 115 may include a pressurized passageway designed to connect the central hub 120 to the outer ring modules 105, facilitating crew and cargo transfer between different gravity environments. The radial access tube 115 may incorporate a variable gravity transition zone, utilizing a gradually sloped floor and adjustable handrails to assist crew members in adapting to the changing gravitational forces as they move radially outward or inward. The radial access tube 115 may be constructed with a telescoping or accordion-like structure to accommodate slight variations in distance between the central hub 120 and outer ring modules 105 during rotation, while maintaining pressure integrity and structural stability In some implementations, the radial access tubes 115 may be designed with a tapered cross-section, potentially wider at the outer ring modules end and narrower towards the central hub 120, to account for the varying artificial gravity levels along their length. The radial access tubes 115 may include adjustable handholds or foot restraints to assist movement between different gravity zones. In some embodiments, radial access tubes 115 may be configured to have an internal diameter of 0.001 meters to 10 meters.

Space vehicle 100 may further include a central hub 120. The central hub 120 may be positioned at the center of the space vehicle 100 and may be connected to the microgravity module 130 via the rotary union 125. In some embodiments, the central hub 120 may include a core structural element that serves as the primary interface and control center for rotating and non-rotating components of space vehicle 100. The central hub 120 may serve multiple functions beyond its structural role. For example, central hub 120 may house critical systems such as power distribution, life support, and command and control centers. In some embodiments, the central hub 120 may be designed with a cylindrical or toroidal shape to optimize mass distribution and structural integrity while rotating. In some embodiments, the central hub 120 may also include docking ports for visiting spacecraft, allowing for resupply missions or crew transfers, as disclosed herein.

The space vehicle 100 may further include a rotary union 125. The rotary union 125 may allow the microgravity module 130 to remain stationary while the central hub 120 and outer ring modules 105 rotate. This configuration may enable the space vehicle 100 to simultaneously provide artificial gravity environments in the rotating sections (i.e., central hub 120 and outer ring modules 105) and a microgravity environment in the stationary microgravity module 130. The rotary union 125 may be a complex mechanism incorporating multiple sealed interfaces for the transfer of power, data, fluids, and gases between the rotating and stationary sections of the space vehicle 100 while maintaining a pressure-tight seal. The rotary union 125 may be designed with redundant systems to ensure continuous operation and may include sensors to monitor its performance and detect potential issues. The rotary union 125 may utilize advanced bearing systems, such as magnetic or fluid bearings, to minimize friction and wear during long-duration missions, and may incorporate redundant sealing mechanisms to ensure reliability in the harsh space environment. The rotary union 125 may also feature a modular design with multiple channels for different utilities, allowing for the simultaneous transfer of various resources like coolant, breathable air, water, and high-bandwidth data signals across the rotating interface.

In some embodiments, the rotary union 125 may include a stator, a rotor, a primary seal, a secondary seal, and a bearing. In some embodiments, the stator may include the stationary component of the rotary union 125 and may be designed to remain fixed relative to the non-rotating microgravity module 130. The stator may incorporate high-strength aerospace-grade materials and precision-machined surfaces to maintain a tight seal with the rotating components while minimizing friction. The stator may feature integrated fluid and electrical channels, allowing for the transfer of resources such as power, data, and life support fluids between the stationary (i.e., the microgravity module 130) and rotating sections (i.e., the outer ring modules 105, radial access tubes 115, circumferential access tubes 110, and central hub 120) of the space vehicle 100.

In some embodiments, the rotor may include the rotating component of the rotary union 125, designed to interface with the central hub 120 and other rotating sections of the space vehicle 100. The rotor may be constructed from advanced aerospace alloys or composite materials to withstand the stresses of continuous rotation while maintaining dimensional stability in the space environment. The rotor may incorporate precision-machined fluid passages and electrical slip rings to facilitate the transfer of resources between the rotating and stationary sections of space vehicle 100.

In some embodiments, the primary seal of the rotary union 125 may include a sealing component designed to maintain pressurization and prevent fluid or gas leakage between the rotating and stationary sections of the space vehicle 100 while minimizing rotational friction. The primary seal may be constructed from advanced materials such as polytetrafluoroethylene (PTFE) composites or perfluoroelastomers, chosen for their low friction coefficients, high chemical resistance, and ability to maintain their properties in extreme temperature ranges typical of space environments. In other embodiments, the primary seal may be formed from at least one of: a compliant polymer material, an organic material, an inorganic material, a metallic material, or a ceramic material. The primary seal may employ a multi-stage design, incorporating labyrinth seals for initial pressure reduction, followed by contact seals with precision-engineered surface finishes to achieve the final hermetic barrier. To enhance longevity and reliability, the primary seal may feature self-lubricating properties or may be integrated with a micro-pumping system to maintain a thin fluid film. The seal design may also incorporate flexible elements to accommodate minor misalignments or thermal expansions without compromising its sealing effectiveness, ensuring consistent performance throughout the operational lifetime of space vehicle 100.

In some embodiments, a secondary seal of rotary union 125 may include a redundant sealing mechanism designed to provide an additional layer of protection against leakage and contamination between the rotating and stationary sections of the space vehicle 100. The secondary seal may be implemented as a backup to the primary seal, utilizing different sealing principles to ensure fail-safe operation. The secondary seal may incorporate advanced materials such as nano-engineered polymers or ceramic composites that offer exceptional wear resistance and thermal stability in the vacuum of space. The secondary seal may be configured as a floating seal with spring-loaded elements to maintain constant contact pressure despite thermal expansions or contractions. The secondary seal may also integrate smart materials that can detect and respond to changes in pressure or the presence of contaminants, activating additional sealing mechanisms or alerting the space vehicle 100 control systems to potential seal degradation. This proactive approach to seal integrity may be crucial for long-duration space missions where maintenance opportunities are limited and system reliability is paramount.

In some embodiments, the bearing of rotary union 125 may be designed to support rotational movement between the stationary and rotating sections of the space vehicle 100 while minimizing friction and wear. The bearing may be implemented in various forms to suit different operational requirements and environmental conditions.

In some embodiments, the bearing may include at least one of a mechanical bearing, a magnetic bearing, an air bearing, or a pumped fluid bearing. A mechanical bearing, such as a ball or roller bearing, may utilize high-performance ceramic materials or aerospace-grade stainless steel to withstand the extreme temperatures and vacuum of space while providing low friction and long operational life. A magnetic bearing may employ powerful rare-earth magnets and precision electromagnetic controls to achieve contactless suspension, eliminating mechanical wear and allowing for active vibration damping. An air bearing may utilize a thin film of gas to provide near-frictionless rotation. For applications requiring extreme precision or where contamination is a concern, a pumped fluid bearing may be employed, circulating a specially formulated low-vapor-pressure fluid to create a stable, low-friction interface capable of supporting high loads while dissipating heat effectively. Each bearing type offers unique advantages in terms of load capacity, rotational accuracy, and reliability.

In some embodiments, the rotary union 125 may further include a thrust bearing. In some embodiments, the thrust bearing may be designed to support and distribute axial loads within the rotary union 125 of the space vehicle 100, ensuring smooth rotation between the stationary and rotating sections while maintaining precise alignment. The thrust bearing may utilize advanced materials such as silicon nitride or zirconium dioxide ceramics, known for their high strength-to-weight ratio and excellent wear resistance in space environments. The bearing design may incorporate multiple rows of rollers or balls arranged in a tapered configuration to effectively handle both axial and radial loads simultaneously. To minimize friction and extend operational life, the thrust bearing may employ a hybrid lubrication system, combining solid lubricants like molybdenum disulfide with a controlled-release liquid lubricant reservoir. The thrust bearing may also feature integrated temperature and vibration sensors to monitor its performance in real-time, allowing for predictive maintenance and ensuring the long-term reliability of the rotary union 125 in the challenging conditions of space operations.

In some embodiments, rotary union 125 may include at least one of a motor integrated with rotary union 125, a motor outside rotary union 125, or rocket thrusters to initiate, maintain, or adjust the rotational motion of the space vehicle's rotating sections. A motor integrated with the rotary union 125 may utilize a direct drive system, such as a brushless DC motor or a permanent magnet synchronous motor, incorporated into the rotary union's housing. This configuration may allow for precise control of rotational speed and torque while minimizing mechanical complexity. The motor may be equipped with high-precision encoders and advanced control algorithms to ensure smooth rotation and mitigate vibrations that could affect microgravity experiments or crew comfort. Alternatively, a motor outside the rotary union 125 may employ a belt drive, gear train, or magnetic coupling to transmit rotational force to the rotating sections. This arrangement may offer advantages in terms of thermal management and ease of maintenance, as the motor can be positioned in a more accessible location. The external motor system may include redundant drive units to ensure operational continuity in case of primary motor failure. Rocket thrusters, when used for rotation control, may be positioned at the periphery of the rotating sections to provide tangential thrust. These thrusters may utilize cold gas propellants or low-thrust monopropellant systems to offer fine control over the rotational dynamics. The thruster system may be integrated with the space vehicle's attitude control system, allowing for coordinated management of both rotational and translational motion. This approach may be particularly useful for initiating rotation from a non-spinning state or for making rapid adjustments to the rotational rate in response to changing mission requirements or mass distribution within the space vehicle 100.

Space vehicle 100 may further include a microgravity module 130, which may be configured to be located coaxial with the rotational axis of space vehicle 100. In some embodiments, the microgravity module 130 may include a specialized module designed to maintain near-zero gravity conditions for scientific experiments and manufacturing processes that require a weightless environment. The microgravity module 130 may be equipped with vibration isolation systems and active stabilization mechanisms to minimize disturbances from the rotating sections of the space vehicle 100. The microgravity module 130 may also incorporate modular experiment racks with standardized interfaces for easy installation and reconfiguration of various payloads, allowing for a wide range of microgravity research in a variety of fields. The microgravity module 130 may include a pressurized environment with precise temperature, humidity, and atmospheric composition control to support sensitive experiments and potential long-duration crew presence. The microgravity module 130 may also include robotic manipulation systems for remote experiment operation and sample handling, which may reduce the need for frequent crew interventions and maximize the utilization of the microgravity environment within microgravity module 130.

In some embodiments, the outer ring modules 105, circumferential access tubes 110, radial access tubes 115, central hub 120, and microgravity module 130 may be inflatable and pre-assembled. This configuration may allow for compact storage during launch and subsequent deployment in space. Alternatively, the components of the space vehicle 100 may be rigid, such as being constructed from aluminum, and may be assembled in space. The choice between inflatable and rigid components may depend on factors such as mission requirements, payload capacity, and operational constraints.

In some embodiments, the components may be formed from an inflatable sheet tube. The inflatable components, when used, may be constructed with multiple layers of high-strength fabrics, impact-resistant materials, and radiation shielding. They may incorporate self-sealing technologies to mitigate the risk of micrometeoroid impacts. The inflation process may be controlled and monitored by a dedicated subsystem to ensure proper deployment and pressurization. The inflatable sheet tube design may allow for compact stowage during launch, significantly reducing the payload volume requirements. Once in orbit, these components may be configured to inflate to their full size using, for example, a controlled gas pressurization system. The inflatable nature of these components may also provide inherent impact resistance and vibration damping properties, which could be beneficial for maintaining stable artificial gravity environments. In some embodiments, each inflatable component may incorporate a rigid core structure or endcaps that may house critical systems and provide attachment points for internal equipment. The sheet tube design may feature integrated reinforcement strands or rigidization systems that may activate post-inflation to enhance structural stability and load-bearing capacity when the components are fully deployed. For example, this may include the use of shape memory polymers or UV-curable resins that harden the structure once fully deployed. Additionally, this approach may facilitate easier on-orbit reconfiguration or expansion of the space vehicle, as new inflatable modules could be attached to existing structures with relative ease. The inflatable sheet tube design may also incorporate self-sealing properties to mitigate the risk of micrometeoroid punctures, ensuring long-term structural integrity in the space environment.

Rigid components, whether used exclusively or in combination with inflatable elements, may be constructed using advanced aerospace-grade materials such as aluminum-lithium alloys, titanium alloys, or carbon fiber reinforced polymers (CFRP) to optimize strength-to-weight ratios.

These materials may be selected for their strength-to-weight ratio, radiation resistance, and thermal properties. In some embodiments, the rigid components may incorporate modular designs to facilitate in-space assembly and future expansions. For example, the rigid construction may provide superior structural integrity and stability to space vehicle 100, particularly important for maintaining precise rotational dynamics and consistent artificial gravity environments. These components may be designed with integrated load-bearing structures to maximize stiffness while minimizing mass. The use of rigid components may allow for more precise integration of subsystems, including power distribution, life support, and thermal control systems, directly into the primary structure of space vehicle 100.

In some embodiments, space vehicle 100 may further include a gyroscope. In some embodiments, the gyroscope may include a precision instrument designed to maintain orientation and angular velocity for stabilization and attitude control of the space vehicle 100. The gyroscope may incorporate a cross-piece with a first weighted end and a second weighted end, allowing the gyroscope to generate a significant angular momentum when rotated, which can be used to counteract unwanted torques and maintain the desired spin axis of the space vehicle 100. The gyroscope may utilize advanced materials such as carbon fiber composites for the cross-piece to maximize strength while minimizing mass, and may employ precision-engineered flywheels at each weighted end to provide the necessary inertial properties for effective attitude control. The gyroscope may utilize advanced technologies such as fiber optic or ring laser systems to achieve high accuracy and long-term stability in the space environment. The gyroscope may be integrated into a larger attitude determination and control system, working in conjunction with star trackers, sun sensors, and magnetometers to provide precise orientation data for maintaining the desired rotation rate of the artificial gravity sections and overall alignment of space vehicle 100.

In some embodiments, outer ring modules 105 may include strategically placed weights to enhance stability and balance of space vehicle 100 during rotation. For example, the outer ring module 105 may incorporate a first weight on its first edge and a second weight on its second edge. These weights may be adjustable or fixed mass elements, and may be composed of high-density materials such as tungsten or depleted uranium, designed to fine-tune the mass distribution and moment of inertia of each outer ring module 105. The placement of these weights at the edges of the outer ring modules 105 may help to maximize the stabilizing effect during rotation, reduce vibrations, and ensure uniform artificial gravity generation. This configuration may also allow for dynamic balancing of the rotating space vehicle 100, compensating for mass shifts due to crew movement or cargo transfers, and maintaining optimal rotational characteristics for long-term space habitation and operations.

In some embodiments, space vehicle 100 may further include a fluid pumping system. In some embodiments, the fluid pumping system may serve as a dynamic mass balancing mechanism for the space vehicle 100, utilizing fluid transfer to adjust the center of mass and maintain optimal rotational stability. The fluid pumping system may include one or more fluid reservoirs, one or more pumps, one or more automated sensors, and one or more response systems. The one or more fluid reservoirs may be strategically positioned within the outer ring modules 105 and may be connected by a network of pipes and valves. The pumps may be high-efficiency, low-mass designs capable of precise fluid transfer in microgravity conditions. The automated sensors may include accelerometers, gyroscopes, and strain gauges distributed throughout the space vehicle 100 to detect minute deviations from the desired rotational axis. These sensors may feed data to the response system, which may employ advanced control algorithms to calculate the necessary fluid redistribution. The response system may command the pumps to transfer fluid between reservoirs, effectively shifting mass within the space vehicle 100 to realign the center of mass with the rotational axis. This active balancing capability may be crucial for maintaining stable artificial gravity conditions, compensating for mass shifts due to crew movement, cargo transfers, or structural deformations, and ensuring the long-term operational stability of the rotating space vehicle 100.

In some embodiments, space vehicle 100 may include one or more docking stations that may be configured to be located coaxial with the rotational axis. For example, the docking station may include a specialized interface mechanism designed to facilitate the secure attachment and transfer of crew, cargo, and resources between the rotating space vehicle and visiting spacecraft. This docking station may incorporate a hybrid docking system that may be compatible with various spacecraft designs. The docking station may feature a non-rotating outer ring connected to a rotating inner mechanism via a high-precision bearing assembly, enabling it to maintain a stable orientation while the rest of the space vehicle 100 rotates. This design may include active control systems to dampen vibrations and compensate for any misalignments during docking procedures. The docking station may be equipped with laser ranging systems, radio frequency sensors, and visual markers to assist in the final approach and soft capture phases of docking operations. To manage the transition between the non-rotating docking interface and the rotating vehicle interior, the docking station may incorporate a transfer chamber with a series of intermeshing iris mechanisms or a rotating airlock system. This may allow for the gradual introduction of rotational forces to crew or cargo moving between the docked spacecraft and the artificial gravity environment of the main space vehicle 100. The docking station may also include umbilical connections for power, data, and fluid transfer, enabling resource sharing and potential long-term attachment of supply modules or additional habitation volumes. Its coaxial location with the rotational axis may minimize the Coriolis effect on approaching spacecraft, simplifying rendezvous and docking maneuvers in the complex gravitational environment of the rotating space vehicle 100.

In some embodiments, space vehicle 100 may further include micrometeoroid and orbital debris protection. In some embodiments, micrometeoroid and orbital debris protection may include a multi-layered shielding system designed to safeguard the space vehicle's 100 critical components and habitable areas from impacts by small, high-velocity particles in the space environment. Integrated with the physical shielding, the protection system may include a network of impact detection sensors using piezoelectric or fiber optic technologies to monitor for strikes and assess potential damage. This sensor network may be linked to the vehicle's overall health monitoring system, allowing for real-time assessment of shield integrity and rapid response to any breaches.

In some embodiments, the space vehicle 100 may also include a propulsion system configured to be located on at least one of the outer ring modules 105 for orbital maintenance and potential relocation. The propulsion system may use electric propulsion for efficiency or chemical thrusters for more rapid maneuvers. The propulsion system may be integrated into the central hub 120 or distributed among the outer ring modules 105 for balanced thrust application. The propulsion system may utilize a combination of high-efficiency electric propulsion units, such as Hall effect thrusters or gridded ion engines, for long-duration, low-thrust operations, and chemical bipropellant thrusters for rapid, high-thrust maneuvers. To manage the unique challenges of a rotating space vehicle, the propulsion system may incorporate advanced control algorithms that account for gyroscopic effects and moment of inertia changes during thruster firings. The propulsion system may also feature canted thruster configurations to minimize plume impingement on solar arrays or other sensitive surfaces. For redundancy and mission flexibility, the propulsion units may be modular and replaceable, allowing for in-space servicing or upgrades as new propulsion technologies become available. The propulsion system may be integrated with the vehicle's guidance, navigation, and control (GNC) subsystem, utilizing data from star trackers, inertial measurement units, and GPS receivers to maintain precise orbital positioning and attitude control. This integration may allow for autonomous orbital maintenance and collision avoidance maneuvers, crucial for long-term operation in increasingly congested orbital environments.

Environmental control and life support systems (ECLSS) may be distributed throughout the space vehicle 100, with redundant systems in different modules to enhance crew safety. These systems may include advanced air revitalization, water recycling, and waste management technologies to support long-duration missions.

The space vehicle 100 may incorporate a sophisticated power generation and distribution system. This may include large solar array panels that can be retracted or repositioned to maintain optimal sun exposure during rotation. In some implementations, the vehicle may also include a small nuclear power source for consistent energy production, especially useful for deep space missions. In some embodiments, space vehicle 100 may include steerable photovoltaic cells. In some embodiments, steerable photovoltaic cells may include an advanced solar power generation system designed to maximize energy production in the dynamic environment of the rotating space vehicle 100. The steering system may employ a combination of sun sensors, star trackers, and inertial measurement units to maintain optimal solar pointing, compensating for both the vehicle's rotation and its orbital motion around Earth. To minimize mass and complexity, the system may use lightweight, high-strength materials such as carbon fiber composites for the support structures and shape memory alloys for the actuation mechanisms. The cells may be arranged in modular arrays, allowing for easy replacement or upgrade during the vehicle's operational lifetime.

In some embodiments, space vehicle 100 may include communication systems. In some embodiments, communication systems may include a comprehensive network of hardware and software components designed to facilitate reliable data transmission and reception between the space vehicle and external entities such as ground stations, relay satellites, and other spacecraft. These systems may incorporate multi-band, software-defined radio (SDR) transceivers capable of operating across a wide range of frequencies, including S-band for telemetry and command, X-band for high-rate science data downlink, and Ka-band for ultra-high bandwidth communications.

In some embodiments, the communications systems may include steerable communication antennas configured to be mounted on at least one of the outer ring modules 105. The steerable communication antennas may include high-gain, directional antenna systems designed to maintain reliable communication links between the rotating space vehicle 100 and external entities such as ground stations, relay satellites, or other spacecraft. These antennas may utilize phased array technology, allowing for rapid and precise beam steering without mechanical movement, which is particularly advantageous in a rotating environment. The antenna system may incorporate multiple planar arrays distributed around the outer ring modules 105 to ensure continuous coverage regardless of the vehicle's rotational position. The system may operate across multiple frequency bands, including S-band for telemetry and command, X-band for high-rate data transmission, and Ka-band for ultra-high bandwidth communications.

The antenna system may also feature adaptive coding and modulation schemes to optimize data throughput under varying link conditions and may incorporate software-defined radio capabilities for flexibility in communication protocols. For redundancy and enhanced coverage, the system may include both primary and secondary antenna arrays, with the ability to seamlessly switch between them or operate in a combined mode for increased gain. This steerable communication antenna configuration may enable high-bandwidth, low-latency communications essential for complex operations, scientific data downlink, and potential commercial applications in the rotating artificial gravity environment.

The space vehicle 100 may also be designed with future expansion in mind. Space vehicle 100 may include additional docking ports or connection points on the outer ring modules 105 or central hub 120 to allow for the addition of new modules or attachment of specialized mission hardware as needed.

Figure 2:
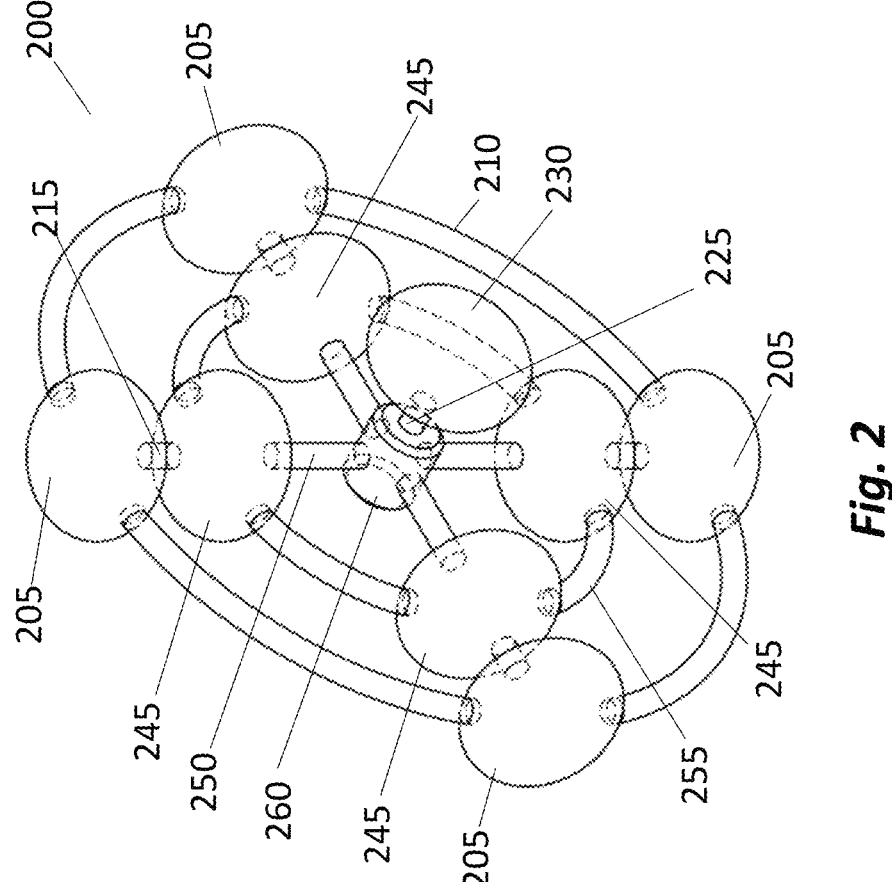
FIG. 2 depicts an isometric view of a space vehicle with multiple concentric ring structures, according to aspects of the present disclosure.

FIG. 2 depicts a space vehicle 200 configured to provide a hybrid gravity environment. Space vehicle 200 may generally correspond to space vehicle 100, as disclosed herein with respect to FIG. 1. The space vehicle 200 may include a plurality of outer ring modules 205, a plurality of inner ring modules 245, a plurality of outer circumferential access tubes 210, a plurality of outer radial access tubes 215, a plurality of inner radial access tubes 250, a plurality of inner circumferential access tubes 255, a central hub 260, a rotary union 225, and a microgravity module 230.

In some embodiments, outer ring modules 205 and inner ring modules 245 may correspond to outer ring modules 105 of space vehicle 100, as disclosed herein with respect to FIG. 1. In some embodiments, outer circumferential access tubes 210 and inner circumferential access tubes 255 may correspond to circumferential access tubes 110 of space vehicle 100, as disclosed herein with respect to FIG. 1. For example, the outer ring modules 205 may be arranged in an outer circular configuration around a central axis of the space vehicle 200. In some embodiments, the outer ring modules 205 may be connected to each other via the outer circumferential access tubes 210, which may allow movement between adjacent outer ring modules 205. The outer ring modules 205 may be configured to produce artificial gravity environments when revolved around the rotational axis. The inner ring modules 245 may be arranged in an inner circular configuration concentric to and inward from the outer ring modules 205. For example, a radius of the inner circular section of inner ring modules 245 may be less than a radius of the outer circular section of outer ring modules 205. The inner ring modules 245 may be connected to each other via the inner circumferential access tubes 255, which may allow movement between adjacent inner ring modules 245. In some embodiments, the rate of revolution of the inner circular section of inner ring modules 245 may be equal to the rate of revolution of the outer circular section of outer ring modules 205. In such embodiments, the inner ring modules 245 may be configured to produce artificial gravity environments with a lower artificial gravity magnitude than the outer ring modules 205 when revolved around the rotational axis.

In some embodiments, the outer radial access tubes 215 and the inner radial access tubes 250 of space vehicle 200 may correspond to radial access tubes 115 of space vehicle 100, as disclosed herein with respect to FIG. 1. The outer radial access tubes 215 may extend from the outer ring modules 205 to the inner ring modules 245, providing a means of transit between these components. The inner radial access tubes 250 may extend from the inner ring modules 245 to the central hub 260, allowing movement between the inner ring modules 245 and the central hub 260.

In some embodiments, central hub 260 may correspond to central hub 120 of space vehicle 100, as disclosed herein with respect to FIG. 1. For example, the central hub 260 may be positioned at the center of the space vehicle 200 and may be connected to the microgravity module 230 via the rotary union 225. The central hub 260 may be configured to rotate with the corresponding inner ring modules 245 and outer ring modules 205.

In some embodiments, rotary union 225 may correspond to rotary union 125 of space vehicle 100 and microgravity module 230 may correspond to microgravity module 130 of space vehicle 100, as disclosed herein with respect to FIG. 1. For example, the rotary union 225 may allow the microgravity module 230 to remain stationary while the central hub 260, inner ring modules 245, and outer ring modules 205 rotate. This configuration may enable the space vehicle 200 to simultaneously provide multiple artificial gravity environments in the rotating sections and a microgravity environment in the stationary microgravity module 230.

Figure 3A:
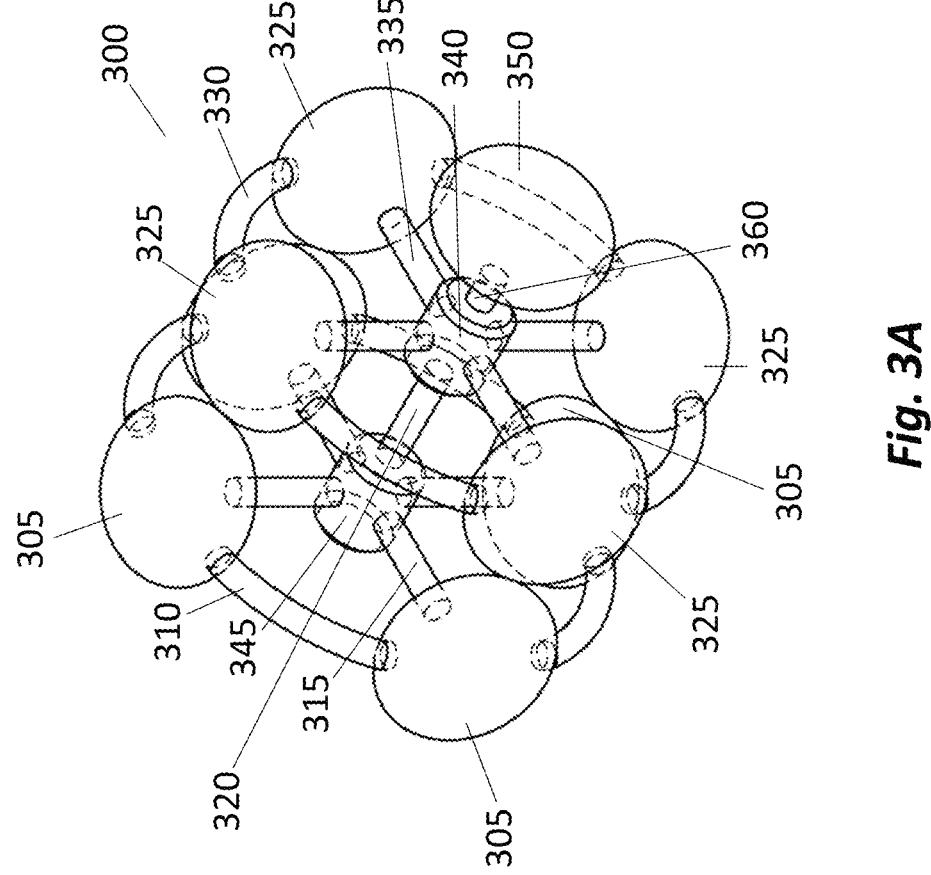
FIG. 3A depicts an isometric view of a space vehicle with two main sections connected by a rotary union, according to aspects of the present disclosure.
Figure 3B:
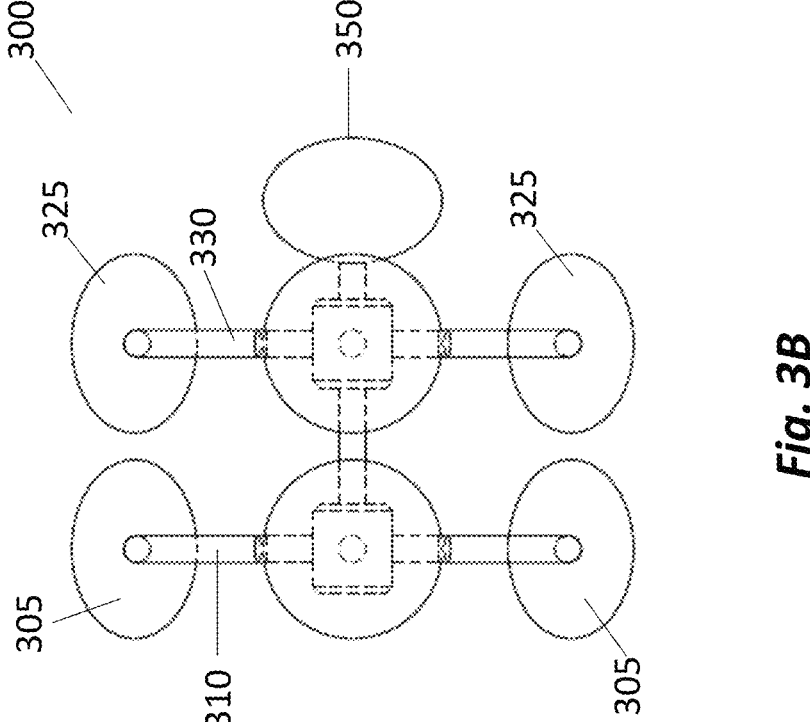
FIG. 3B depicts a side view of the space vehicle of FIG. 3A, according to aspects of the present disclosure.
Figure 3C:
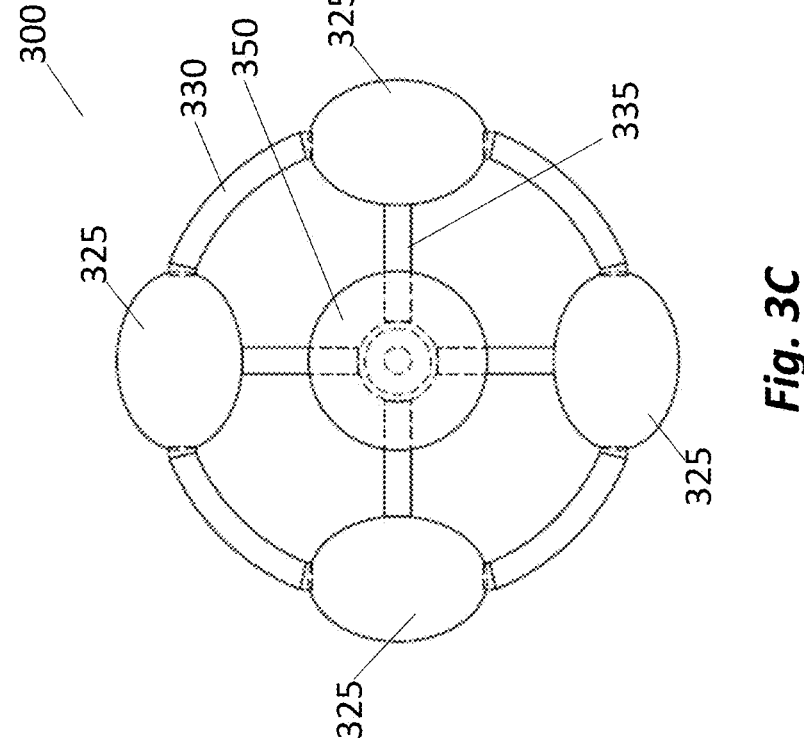
FIG. 3C depicts a front view of the space vehicle of FIG. 3A, according to aspects of the present disclosure.

FIG. 3A depicts a perspective view space vehicle 300 configured to provide a hybrid gravity environment. FIG. 3B depicts a side view of space vehicle 300. FIG. 3C depicts a front view of space vehicle 300. In some embodiments, space vehicle 300 may generally correspond to space vehicle 100, as disclosed herein with respect to FIG. 1. The space vehicle 300 may include two main sections connected in parallel by a second rotary union 320. This configuration may allow the two sections to rotate at different rates, enabling the creation of varying levels of artificial gravity within the space vehicle 300.

The first section of the space vehicle 300 may include a plurality of outer ring modules 305, a plurality of circumferential access tubes 310, a plurality of radial access tubes 315, and a central hub 345. In some embodiments, the outer ring modules 305 may correspond to outer ring modules 105, the circumferential access tubes 310 may correspond to the circumferential access tubes 110, the radial access tubes 315 may correspond to the radial access tubes 115, and the central hub 345 may correspond to central hub 120, as disclosed herein with respect to FIG. 1. For example, the outer ring modules 305 may be arranged in a circular configuration and connected to each other via the circumferential access tubes 310, which may allow movement between adjacent outer ring modules 305. The radial access tubes 315 may extend from the outer ring modules 305 to the central hub 345, providing a means of transit between these components.

The second section of the space vehicle 300 may include a plurality of secondary outer ring modules 325, a plurality of secondary circumferential access tubes 330, a plurality of secondary radial access tubes 335, and a second central hub 340. In some embodiments, the secondary outer ring modules 325 may correspond to outer ring modules 105, the secondary circumferential access tubes 330 may correspond to the circumferential access tubes 110, the secondary radial access tubes 335 may correspond to the radial access tubes 115, and the second central hub 340 may correspond to central hub 120, as disclosed herein with respect to FIG. 1. For example, the secondary outer ring modules 325 may be arranged in a circular configuration and connected to each other via the secondary circumferential access tubes 330, allowing movement between adjacent secondary outer ring modules 325. The secondary radial access tubes 335 may extend from the secondary outer ring modules 325 to the second central hub 340, facilitating movement between these components. In some embodiments, as depicted in FIG. 3A, a distance between secondary outer ring modules 325 and second central hub 340 may be equal to a distance between outer ring modules 305 and central hub 345. In other embodiments, a distance between secondary outer ring modules 325 and second central hub 340 may be less than or greater than a distance between outer ring modules 305 and central hub 345. Accordingly, varying levels of artificial gravity may be generated in outer ring modules 305 and secondary outer ring modules 325 to support varying mission requirements.

The second rotary union 320 may connect the central hub 345 of the first section to the second central hub 340 of the second section of space vehicle 300. The second rotary union 320 may allow the two sections of space vehicle 300 to rotate independently. In some embodiments, the two sections of space vehicle 300 may rotate at the same rate or at different rates. Such a configuration may enable the space vehicle 300 to create different artificial gravity environments in each section, which may allow space vehicle 300 to accommodate a variety of mission and payload requirements.

At the end of the second section, a rotary union 360 may connect the second central hub 340 to a microgravity module 350. In some embodiments, the rotary union 360 may correspond to rotary union 125, as disclosed herein with respect to FIG. 1. In some embodiments, the microgravity module 350 may correspond to microgravity module 130, as disclosed herein with respect to FIG. 1. For example, the rotary union 360 may allow the microgravity module 350 to remain stationary while the rest of the space vehicle 300 rotates. The microgravity module 350 may be configured to provide a microgravity environment that may be used to meet additional mission and payload requirements. This arrangement may allow the space vehicle 300 to simultaneously offer artificial gravity environments in its rotating sections and a microgravity environment in the stationary microgravity module 350, enabling a wide range of space-based activities and research. In some embodiments, each of the second central hub 340 and the central hub 345 may be associated with a microgravity module 350. In some embodiments, the central hub 345 may be associated with yet further central hubs or other modules.

Figure 4:
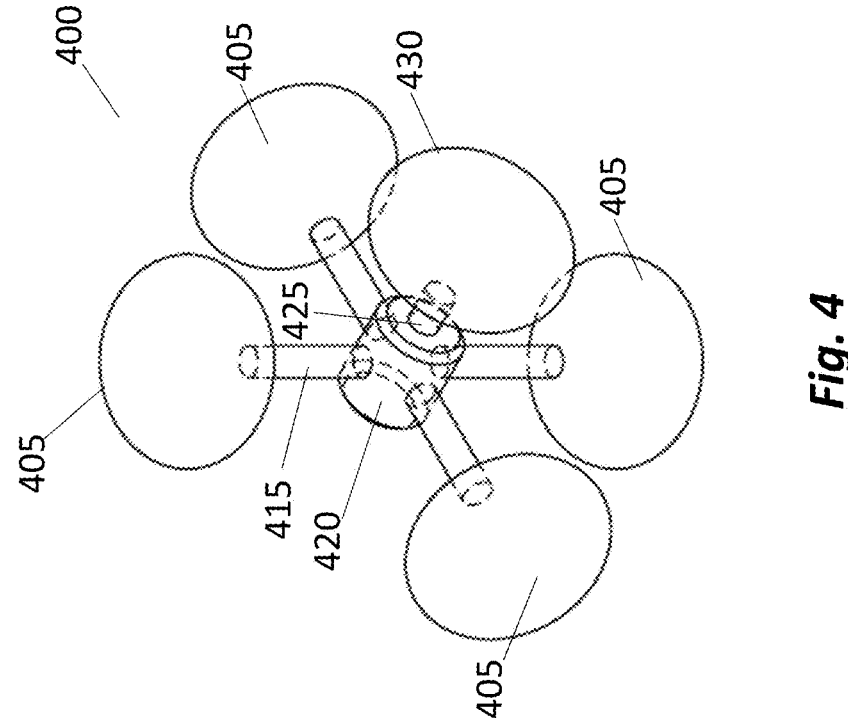
FIG. 4 depicts an isometric view of a space vehicle, according to aspects of the present disclosure.

FIG. 4 depicts a space vehicle 400 configured to provide a hybrid gravity environment. In some embodiments, space vehicle 400 may generally correspond to space vehicle 100, as disclosed herein with respect to FIG. 1. The space vehicle 400 may include a plurality of outer ring modules 405, a plurality of radial access tubes 415, a central hub 420, a rotary union 425, and a microgravity module 430. In some embodiments, the outer ring modules 405 may correspond to outer ring modules 105, the radial access tubes 415 may correspond to radial access tubes 115, the central hub 420 may correspond to central hub 120, the rotary union 425 may correspond to rotary union 125, and the microgravity modules 430 may correspond to the microgravity module 130 of space vehicle 100, as disclosed herein with respect to FIG. 1.

For example, the outer ring modules 405 may be arranged in a circular configuration around a central axis of the space vehicle 400. In some embodiments, the outer ring modules 405 may be configured to produce artificial gravity environments when revolved around the rotational axis. The artificial gravity magnitude within the outer ring modules 405 may be adjusted by varying the rotational speed of the space vehicle 400 or by altering the distance of the outer ring modules 405 from the rotational axis. In some embodiments, as depicted in FIG. 4, each of outer ring modules 405 may be located at an equal distance from central hub 420. In other embodiments, outer ring modules 405 may be located at varying distances from central hub 420. The radial access tubes 415 may extend from the central hub 420 to the outer ring modules 405, providing a means of transit between central hub 420 and outer ring module 405. The radial access tubes 415 may allow movement between different gravity environments within the space vehicle 400. The central hub 420 may be positioned at the center of the space vehicle 400 and may be configured to rotate with the corresponding outer ring modules 405. The central hub 420 may serve as a connection point between the rotating sections of the space vehicle 400 and the stationary microgravity module 430. The rotary union 425 may connect the central hub 420 to the microgravity module 430. The rotary union 425 may be designed to allow the microgravity module 430 to remain stationary and non-rotating while the central hub 420 and outer ring modules 405 may rotate. This configuration may enable the simultaneous provision of artificial gravity and microgravity environments within the space vehicle 400. The microgravity module 430 may be positioned coaxially with the rotational axis of the space vehicle 400. By remaining stationary relative to the rotating sections, the microgravity module 430 may provide a microgravity environment for experiments, manufacturing processes, or other activities that require near-zero gravity conditions.

In some embodiments, the arrangement of components in the space vehicle 400 may allow for a gravity gradient within the structure. The outer ring modules 405, being furthest from the rotational axis, may experience the highest artificial gravity when the space vehicle 400 is rotating. The central hub 420 may experience less artificial gravity due to its closer proximity to the rotational axis. The microgravity module 430, being stationary, may provide a microgravity environment. The configuration of the space vehicle 400 may enable various space-based activities and research by providing multiple gravity environments within a single structure. For example, crew members may reside in the artificial gravity environment of the outer ring modules 405 to mitigate the physiological effects of long-term space travel, while conducting experiments or manufacturing processes in the microgravity conditions of the microgravity module 430.

Figure 5:
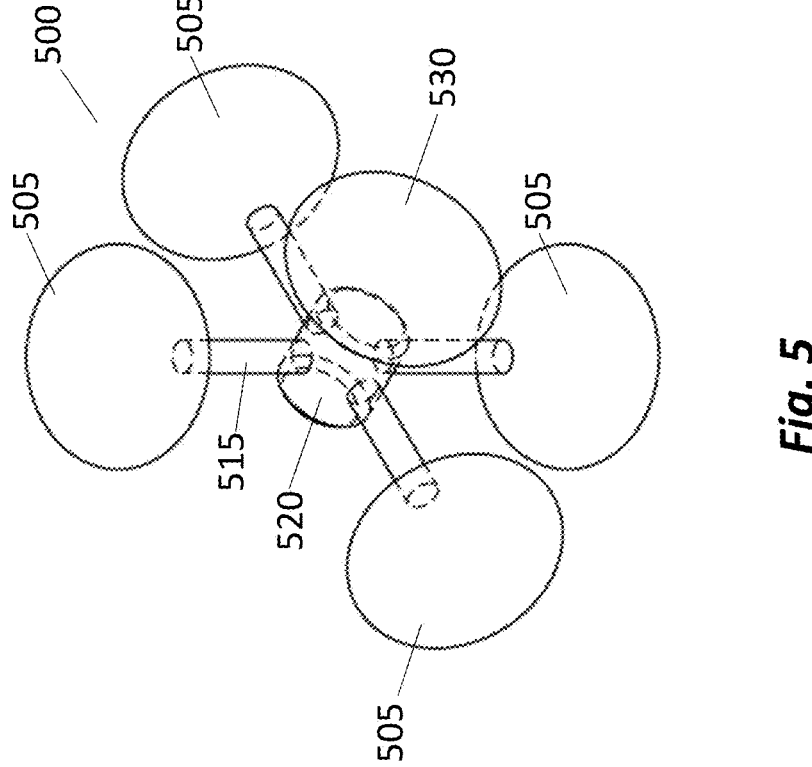
FIG. 5 depicts an isometric view of a space vehicle with a rigidly connected microgravity module, according to aspects of the present disclosure.

FIG. 5 depicts a space vehicle 500 configured to provide a hybrid gravity environment when deployed in space. In some embodiments, space vehicle 500 may generally correspond to space vehicle 100, as disclosed herein with respect to FIG. 1. The space vehicle 500 may include a plurality of outer ring modules 505, a plurality of radial access tubes 515, a central hub 520, and a central module 530.

The outer ring modules 505 may be arranged in a circular configuration around a central axis of the space vehicle 500. In some embodiments, outer ring modules 505 may correspond to outer ring modules 105 of space vehicle 100, as disclosed herein with respect to FIG. 1. For example, in some embodiments, the outer ring modules 505 may be configured to produce artificial gravity environments when revolved around the rotational axis. The artificial gravity magnitude within the outer ring modules 505 may be adjusted by varying the rotation speed of the space vehicle 500 or by altering the distance of the outer ring modules 505 from the rotational axis. In some embodiments, as depicted in FIG. 5, each of outer ring modules 505 may be located an equal distance from central hub 520. In other embodiments, outer ring modules 505 may be located at varying distances from central 520, such that different outer ring modules may be configured to produce different levels of artificial gravity. The configuration of the space vehicle 500 may enable various space-based activities and research by providing multiple gravity environments within a single structure.

Space vehicle 500 may further comprise radial access tubes 515. In some embodiments, radial access tubes 515 may correspond to radial access tubes 115 of space vehicle 100, as disclosed herein with respect to FIG. 1. The radial access tubes 515 may extend from the central hub 520 to the outer ring modules 505, providing a means of transit between these components.

Space vehicle 500 may further comprise central hub 520. In some embodiments, central hub 520 may correspond to central hub 120 of space vehicle 100, as disclosed herein with respect to FIG. 1. The central hub 520 may be positioned at the center of the space vehicle 500 and may be configured to rotate with the corresponding outer ring modules 505. In this configuration, the central hub 520 may serve as a connection point between the rotating sections of the space vehicle 500 and the microgravity module 530.

Space vehicle 500 may further include central module 530. In some embodiments, central module 530 may correspond to microgravity module 130 of space vehicle 100, as disclosed herein with respect to FIG. 1. As depicted in FIG. 5, the central module 530 in the space vehicle 500 may be rigidly connected to the central hub 520. For example, the central module 530 may include a specialized compartment designed to provide a near-zero gravity environment while being structurally integrated with the rotating sections of the space vehicle 500. This configuration may utilize high-strength, low-mass materials such as carbon fiber reinforced polymers (CFRP) or advanced metal matrix composites to create a rigid connection capable of withstanding the stresses induced by the rotation of space vehicle 500. The rigid connection may further incorporate vibration isolation systems, such as passive dampers or active isolation mounts, to minimize the transmission of rotational forces to the central module 530. In some embodiments, the central module 530 may be positioned as close as possible to the center of rotation of space vehicle 500 to minimize the centripetal acceleration experienced within it. To facilitate access and payload transfer, the rigid connection may include a transfer airlock or a small diameter rotary joint that may allow for the passage of materials between the rotating and non-rotating sections of the space vehicle 500. This design approach may enable the space vehicle 500 to simultaneously provide artificial gravity environments in its outer ring modules 505 while maintaining a microgravity zone at the central module 530, offering versatility for various space-based research and manufacturing applications.

The rigid connection between the central hub 520 and the central module 530 may affect the gravity environment within the space vehicle 500. In some embodiments, this configuration may create a gravity gradient within the structure. The outer ring modules 505, being furthest from the rotational axis, may experience the highest artificial gravity when the space vehicle 500 is rotating. The central hub 520 may experience less artificial gravity due to its closer proximity to the rotational axis. The central module 530, while rotating, may experience the least (or no) artificial gravity due to its position closest to the rotational axis. This arrangement may allow for a range of gravity conditions within a single structure and may enable various types of research or operations that require different levels of gravity. For example, experiments or manufacturing processes that require very low gravity conditions may be conducted in the central module 530, while activities requiring higher gravity may be performed in the outer ring modules 505.

Figure 6:
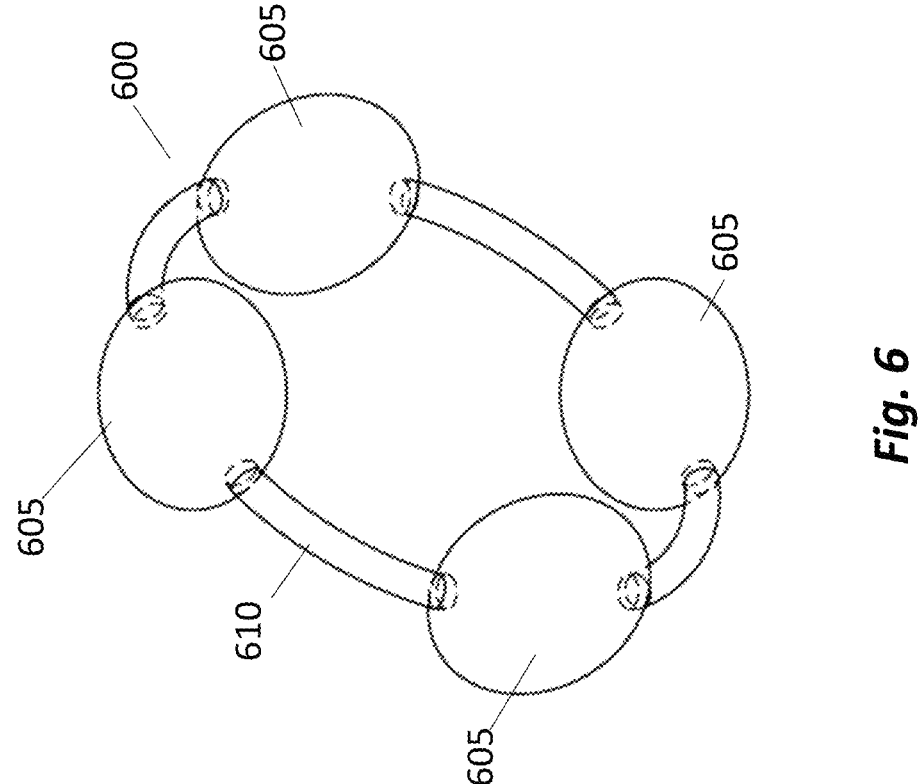
FIG. 6 depicts an isometric view of a space vehicle with interconnected outer ring modules, according to aspects of the present disclosure.

FIG. 6 depicts a space vehicle 600 configured to provide a hybrid gravity environment when deployed in space. In some embodiments, space vehicle 600 may generally correspond to space vehicle 100, as disclosed herein with respect to FIG. 1. The space vehicle 600 may include a plurality of outer ring modules 605 arranged in a circular configuration. In some embodiments, the outer ring modules 605 may correspond to outer ring modules 105 of space vehicle 100, as disclosed herein with respect to FIG. 1. For example, in some embodiments, the outer ring modules 605 may be designed to produce artificial gravity environments when revolved around a rotational axis. In some embodiments, each of the outer ring modules 605 may have the same or different artificial gravity magnitudes, depending on their distance from the rotational axis and the rotation speed of the space vehicle 600.

The outer ring modules 605 may be interconnected by a plurality of circumferential access tubes 610, which may allow movement between adjacent outer ring modules 605. The circumferential access tubes 610 may correspond to the circumferential access tubes 110 of space vehicle 100, as disclosed herein with respect to FIG. 1. For example, the circumferential access tubes 610 may form a continuous pathway around the circumference of the space vehicle 600, enabling crew members to move between the outer ring modules 605. In some embodiments, the circumferential access tubes 610 may be designed to withstand the forces generated by the rotation of the space vehicle 600 while maintaining a pressurized environment for safe passage. The circular arrangement of the outer ring modules 605 connected by the circumferential access tubes 610 may create a ring-like structure. This configuration may allow for the generation of artificial gravity through centripetal acceleration when the space vehicle 600 rotates around its central axis.

In some embodiments, the space vehicle 600 may provide temporal gravity gradients by altering the spin rate through time. By adjusting the rotational speed of the space vehicle 600, the artificial gravity magnitude experienced within the outer ring modules 605 may be varied. This feature may allow for experiments or operations requiring different gravity levels at different times. Docking with current technology may be infeasible with the space vehicle 600 operating with a positive spin rate. As such, the space vehicle 600 may be configured to be decelerated when docking is needed. The space vehicle 600 may further be equipped with docking equipment configured to allow docking with technologies that may not be feasible at the time of deployment of the space vehicle 600, so that the space vehicle 600 may be used with advances in docking technology.

Figure 7:
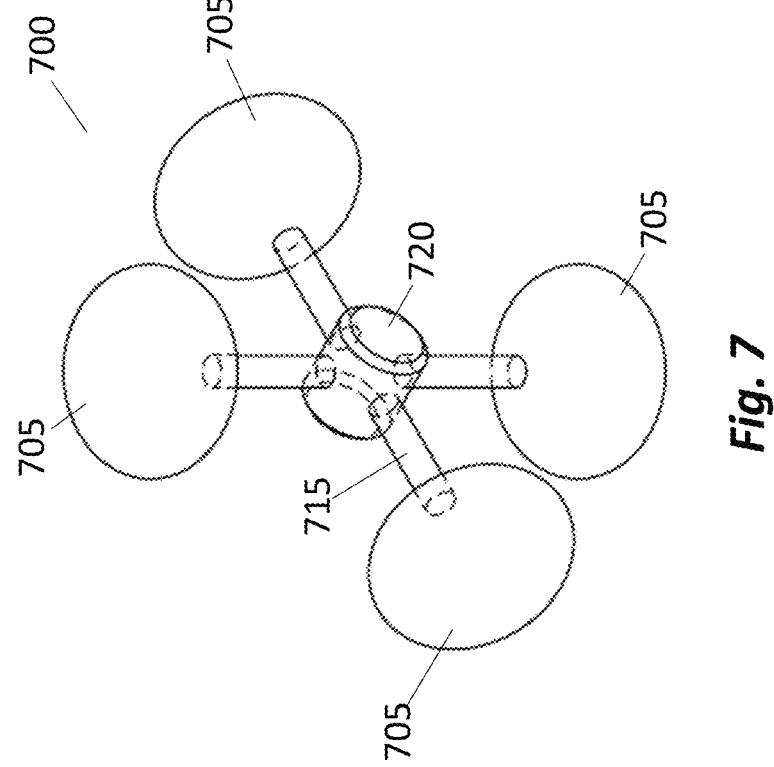
FIG. 7 depicts an isometric view of a space vehicle with radial access tubes, according to aspects of the present disclosure.

FIG. 7 depicts a space vehicle 700 configured to provide a hybrid gravity environment when deployed in space. In some embodiments, space vehicle 700 may generally correspond to space vehicle 100, as disclosed herein with respect to FIG. 1. The space vehicle 700 may include a plurality of outer ring modules 705, a plurality of radial access tubes 715, and a central hub 720 arranged in a radial configuration around a central axis.

The outer ring modules 705 may be arranged in a circular formation around the central axis of the space vehicle 700. In some embodiments, outer ring modules 705 may correspond to outer ring modules 105 of space vehicle 100, as disclosed herein with respect to FIG. 1. For example, in some embodiments, the outer ring modules 705 may be designed to produce artificial gravity environments when revolved around the rotational axis. The artificial gravity magnitude within the outer ring modules 705 may be adjusted by varying the rotation speed of the space vehicle 700 or by altering the distance of the outer ring modules 705 from the rotational axis.

The radial access tubes 715 may extend outward from the central hub 720 to the outer ring modules 705. In some embodiments, radial access tubes 715 may correspond to radial access tubes 115 of space vehicle 100, as disclosed herein with respect to FIG. 1. For example, in some embodiments, the radial access tubes 715 may provide a pathway for occupants or equipment to move between the central hub 720 and the outer ring modules 705. This design may allow for efficient transfer between different gravity environments within the space vehicle 700. The central hub 720 may be positioned at the center of the space vehicle 700. In some embodiments, central hub 720 may correspond to central hub 120 of space vehicle 100, as disclosed herein with respect to FIG. 1. For example, in some embodiments, the central hub 720 may serve as the core of the space vehicle 700, and may house critical systems and serving as a connection point for the radial access tubes 715.

The radial configuration of the space vehicle 700 may enable the creation of varying levels of artificial gravity. When the space vehicle 700 rotates around its central axis, the outer ring modules 705 may experience the highest level of artificial gravity due to their distance from the axis of rotation. The artificial gravity may decrease along the length of the radial access tubes 715, with the central hub 720 experiencing the lowest level of artificial gravity. In some embodiments, the arrangement of the outer ring modules 705 in a circular formation around the central hub 720 may allow the space vehicle 700 to create a gravity gradient. This gradient may provide different gravity environments at various distances from the central axis, potentially enabling a range of experiments or operations that require different levels of gravity within the same structure. The radial configuration of the space vehicle 700 may offer flexibility in terms of gravity environments. By adjusting the rotation speed of the space vehicle 700, the artificial gravity levels throughout the structure may be modified. This feature may allow for adaptability in conducting various types of research or accommodating different operational needs over the course of a mission.

Figure 8A:
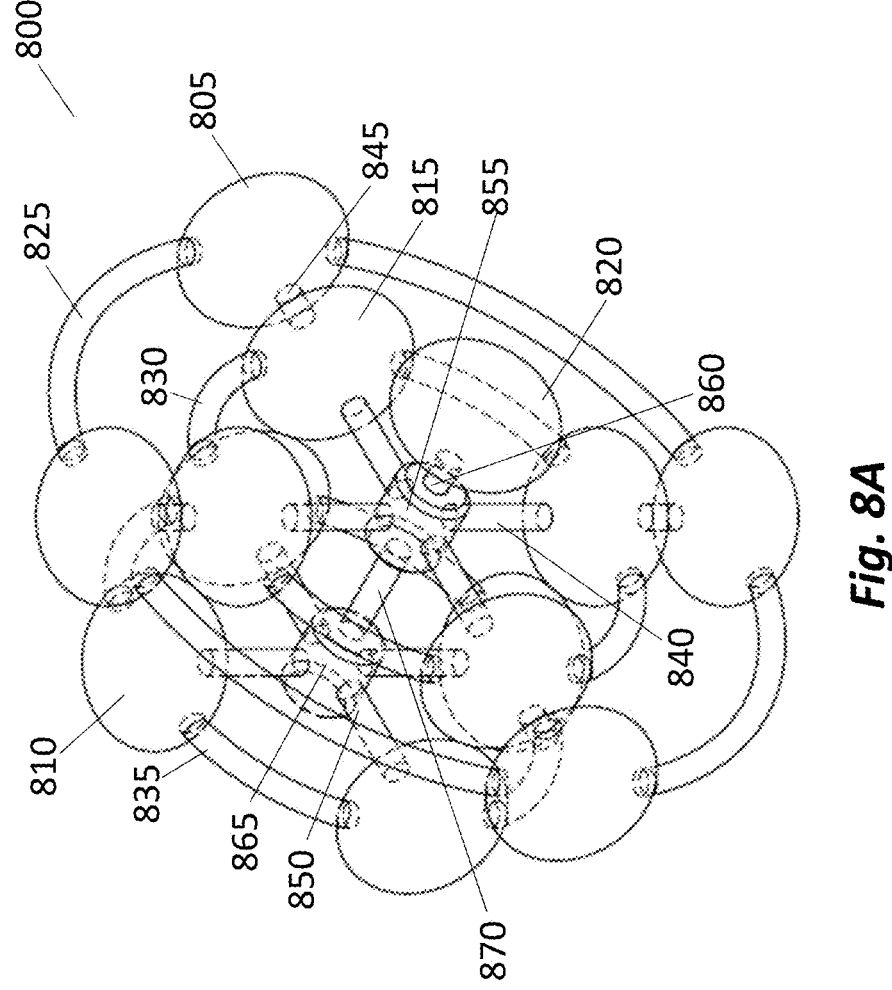
FIG. 8A depicts an isometric view of a space vehicle with multiple interconnected ring structures, according to aspects of the present disclosure.
Figure 8B:
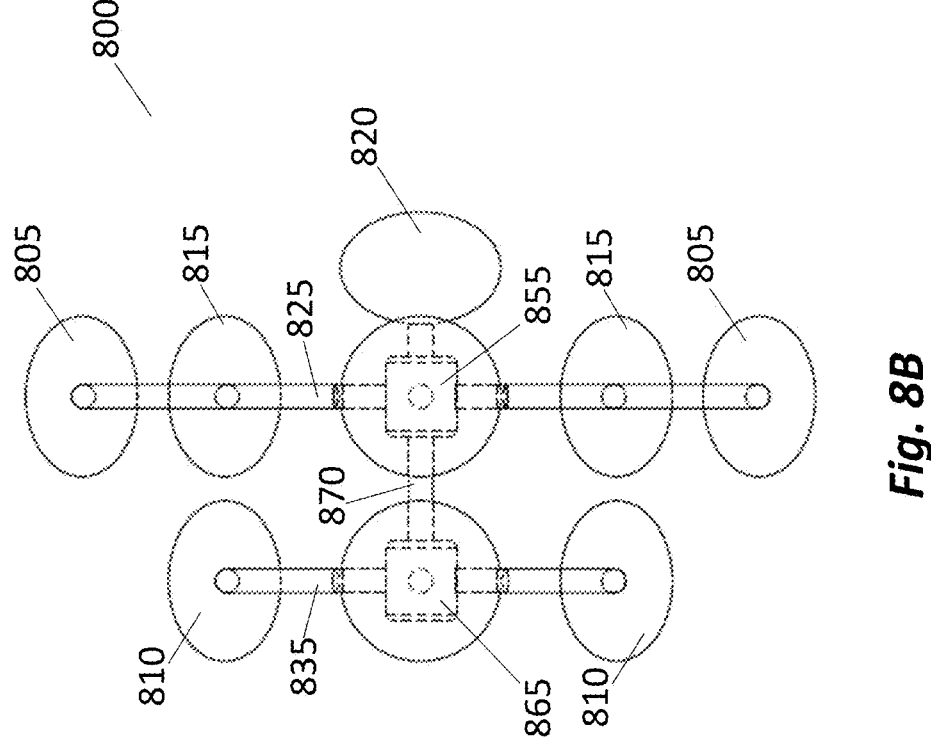
FIG. 8B depicts a side view of the space vehicle of FIG. 8A, according to aspects of the present disclosure.
Figure 8C:
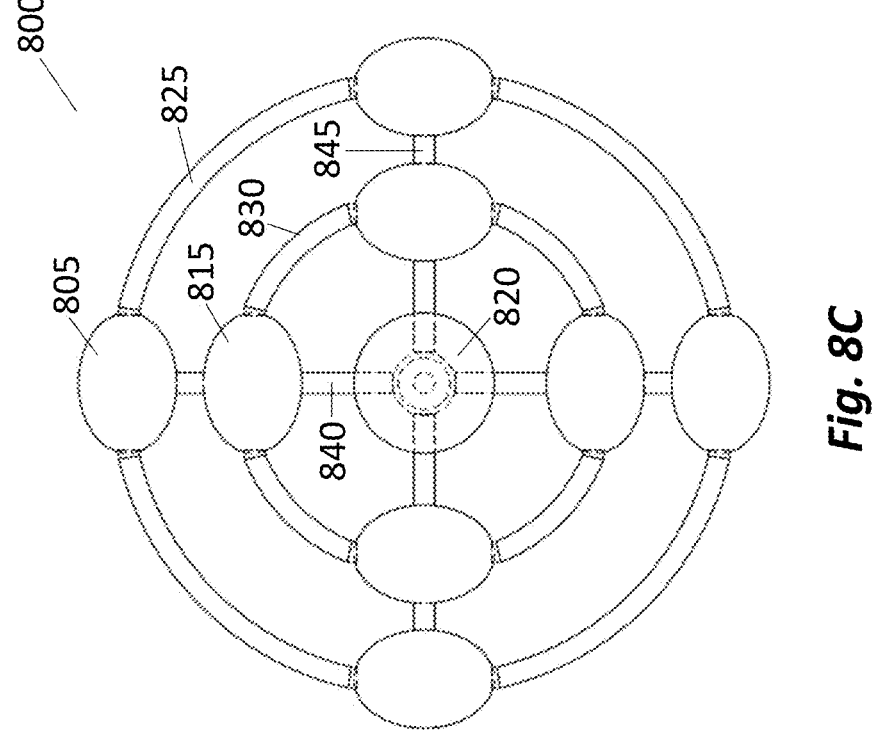
FIG. 8C depicts a front view of the space vehicle of FIG. 8A, according to aspects of the present disclosure.

FIG. 8A, FIG. 8B, and FIG. 8C illustrate a space vehicle 800 configured to provide a hybrid gravity environment. In some embodiments, space vehicle 800 may generally correspond to space vehicle 100, as disclosed herein with respect to FIG. 1. The space vehicle 800 may include a plurality of outer ring modules 805, a plurality of parallel ring modules 810, a plurality of inner ring modules 815, and a microgravity module 820 arranged concentrically around a central axis. In some embodiments, outer ring modules 805, parallel ring modules, and inner ring modules may correspond to outer ring modules 105 of space vehicle 100, as disclosed herein with respect to FIG. 1. In some embodiments, microgravity module 820 may correspond to microgravity module 130 of space vehicle 100, as disclosed herein with respect to FIG. 1.

For example, in some embodiments, the outer ring modules 805 may be arranged in a circular configuration and may connected to each other via outer circumferential access tubes 825. In some embodiments, the outer circumferential access tubes 825 may correspond to circumferential access tubes 110 of space vehicle 100, as disclosed herein with respect to FIG. 1. For example, in some embodiments, the outer circumferential access tubes 825 may allow movement between adjacent outer ring modules 805. The parallel ring modules 810 may be arranged in a circular configuration concentric to and inward from the outer ring modules 805. The parallel ring modules 810 may be connected to each other via parallel circumferential access tubes 835, which may allow movement between adjacent parallel ring modules 810. In some embodiments, the parallel circumferential access tubes 835 may correspond to circumferential access tubes 110 of space vehicle 100, as disclosed herein with respect to FIG. 1. The inner ring modules 815 may be arranged in a circular configuration concentric to and inward from the parallel ring modules 810. The inner ring modules 815 may be connected to each other via inner circumferential access tubes 830, which may allow movement between adjacent inner ring modules 815. In some embodiments, the inner circumferential access tubes 830 may correspond to circumferential access tubes 110 of space vehicle 100, as disclosed herein with respect to FIG. 1. The outer ring modules 805, the parallel ring modules 810, and the inner ring modules 815 may be configured to produce artificial gravity environments when revolved around the rotational axis.

The space vehicle 800 may incorporate a network of radial access tubes for movement between different sections of space vehicle 800. Outer radial access tubes 845 may connect the outer ring modules 805 to the inner ring modules 815. Parallel radial access tubes 850 may connect the parallel ring modules 810 to a second central hub 865. Inner radial access tubes 840 may connect the inner ring modules 815 to a central hub 855. In some embodiments, radial access tubes 845, parallel radial access tubes 850, and inner radial access tubes 840 may correspond to radial access tubes 115 of space vehicle 100, as disclosed herein with respect to FIG. 1.

Space vehicle 800 may further include central hub 855. In some embodiments, central hub 855 may correspond to central hub 120 of space vehicle 100, as disclosed herein with respect to FIG. 1. For example, the central hub 855 may be connected to the inner ring modules 815 via the inner radial access tubes 840. In some embodiments, the central hub 855 may be connected to the microgravity module 820 through a rotary union 860. Microgravity module 820 may correspond to microgravity module 130 and rotary union 860 may correspond to rotary union 125 of space vehicle 100, as disclosed herein with respect to FIG. 1. The rotary union 860 may allow the microgravity module 820 to remain stationary while other sections of the space vehicle 800 rotate. The second central hub 865 may be connected to the parallel ring modules 810 via the parallel radial access tubes 850. In some embodiments, second central hub 865 may correspond to central hub 120 of space vehicle 100, as disclosed herein with respect to FIG. 1. In some embodiments, the second central hub 865 may be linked to the central hub 855 through a second rotary union 870. In some embodiments, the second rotary union 870 may correspond to rotary union 125 of space vehicle 100, as disclosed herein with respect to FIG. 1. The second rotary union 870 may enable different rotation rates between sections of the space vehicle 800. The microgravity module 820 may be positioned along the central axis of the space vehicle 800. In some embodiments, the microgravity module 820 may be designed to provide a microgravity environment.

The space vehicle 800 design may allow for the simultaneous provision of various gravity environments. The outer ring modules 805, being furthest from the rotational axis, may experience the highest level of artificial gravity when the space vehicle 800 rotates. The parallel ring modules 810 and inner ring modules 815 may experience lower levels of artificial gravity due to their closer proximity to the rotational axis. The microgravity module 820 may provide a microgravity environment. In some embodiments, the second rotary union 870 may allow the parallel ring modules 810 to rotate at a different rate than the outer ring modules 805 and inner ring modules 815.

This configuration may enable the creation of different artificial gravity levels in different sections of the space vehicle 800. Further, the concentric arrangement of the ring modules at different radii from the rotational axis may enable the creation of a gravity gradient within the space vehicle 800. This configuration may provide flexibility for various space-based activities requiring different gravity conditions.

Figure 9:
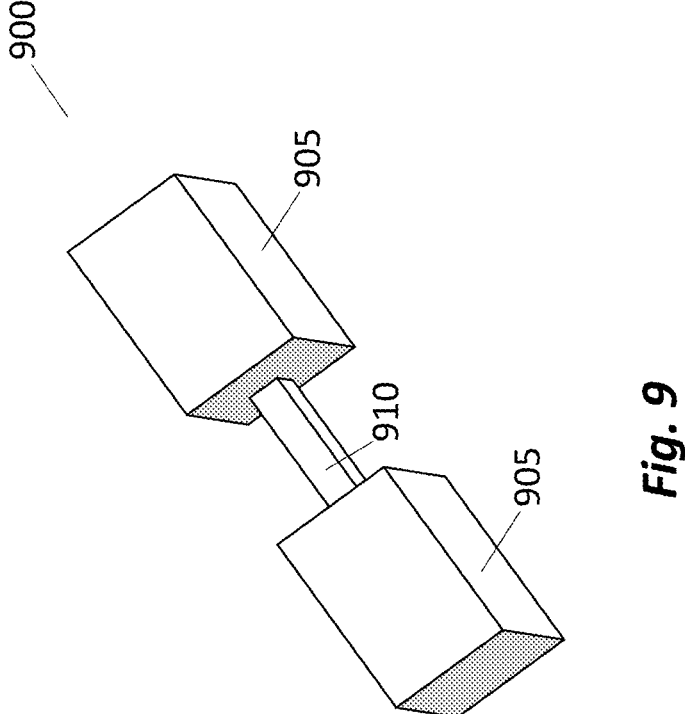
FIG. 9 depicts an isometric view of a space vehicle with two modules connected by a radial tube, according to aspects of the present disclosure.

FIG. 9 depicts a space vehicle 900 configured to provide a hybrid gravity environment when deployed in space. The space vehicle 900 may include at least two modules 905 connected by at least one radial tube 910.

The modules 905 may be rectangular structures positioned at opposite ends of the radial tube 910. In other embodiments, modules 905 may be any shape. In some embodiments, the modules 905 may be configured to produce artificial gravity environments having artificial gravity magnitudes and artificial gravity gradients when revolved around a rotational axis. In some embodiments, an artificial gravity gradient may include a controlled variation in the magnitude of simulated gravitational force experienced at different locations within the modules 905. The artificial gravity gradient may be achieved through the strategic placement of modules 905 at varying distances from the rotational axis, allowing for a range of artificial gravity environments from near-Earth gravity in outer portions of modules 905 to reduced gravity conditions in inner portions of modules 905 closer to the center of rotation. For example, an artificial gravity magnitude at an outer edge of module 905 (i.e., the edge of module 905 furthest from the rotational axis) may be greater than an artificial gravity magnitude at an inner edge of module 905 (i.e., the edge of module 905 closest to the rotational axis). In some embodiments, the artificial gravity magnitude at the inner edge of module 905 may be about seventy percent of the artificial gravity magnitude at the outer edge of module 905. In other embodiments, the artificial gravity magnitude at the inner edge of module 905 may be greater than or less than seventy percent of the artificial gravity magnitude at the outer edge of module 905. In some embodiments, the artificial gravity magnitude at the outer edge of module 905 may be about 0.006 g to about 0.180 g. In other embodiments, the artificial gravity magnitude at the outer edge of module 905 may be less than 0.006 g or greater than 0.180 g. In some embodiments, the artificial gravity magnitude at the inner edge of module 905 may be between about 0.004 g and about 0.120 g. In other embodiments, the artificial gravity magnitude may be less than 0.004 g or greater than 0.120 g. The artificial gravity gradient may enable diverse research opportunities and operational flexibility, accommodating experiments requiring different gravitational conditions. Each of the modules 905 may have the same or different artificial gravity magnitudes depending on their distance from the rotational axis and rotational speed of the space vehicle 900. In some embodiments, each of modules 905 may be configured to produce a volume of about 0.001 cubic meters to 1,000 cubic meters. In other embodiments, each of modules 905 may be configured to produce a volume less than 0.001 cubic meters or greater than 1,000 cubic meters. In some embodiments, each of modules 905 may be pressurized or unpressurized. In some embodiments, one of module 905 may be pressurized and one of modules 905 may be unpressurized.

Each of modules 905 may further include a plurality of payload compartments. In some embodiments, the plurality of payload compartments may include modular, standardized spaces within each of module 905 designed to accommodate various scientific experiments, technological demonstrations, or cargo storage. The payload compartments may feature adjustable environmental controls, power and data interfaces, and vibration isolation systems to support a wide range of payload requirements. In some embodiments, the payload compartments may include at least one mounting rail, a least one power connection, at least one data connection, and at least one port located on an external surface of each of the modules 905.

In some embodiments, the at least one mounting rail may include a standardized structural interface designed to secure and support various payloads within the payload compartments of each module 905. The mounting rail may be constructed from lightweight, high-strength aerospace-grade materials such as aluminum alloys or carbon fiber composites to minimize mass while maintaining structural integrity in the microgravity environment. The mounting rail system may incorporate precision-machined tracks with integrated quick-release mechanisms, allowing for rapid installation, removal, and reconfiguration of experimental apparatus, storage containers, or other payloads. These rails may feature adjustable attachment points with standardized bolt patterns compatible with common spacecraft payload interfaces, enabling versatility in accommodating different payload sizes and configurations. The mounting rail design may also include integrated cable routing channels and standardized power and data connectors to facilitate seamless integration of payloads with the systems of space vehicle 900. Additionally, the rails may incorporate vibration isolation elements, such as viscoelastic dampers or active isolation systems, to protect sensitive equipment from launch vibrations and in-orbit disturbances.

In some embodiments, the at least one power connection and the at least one data connection may include standardized interfaces designed to provide electrical power and data transmission capabilities to payloads within the payload compartments of each module 905. The power connection may utilize a high-reliability connector system capable of delivering various voltage levels with built-in circuit protection and power conditioning to accommodate different payload power requirements. The power interface may incorporate smart power management features, allowing for remote monitoring and control of power allocation to individual payloads. The data connection may employ a high-speed, radiation-hardened interface capable of supporting data rates up to several gigabits per second. The data interface may include error detection and correction protocols to ensure reliable communication in the presence of space radiation, and may support various data formats and protocols commonly used in space systems. Both connections may be designed with hot-swap capabilities, allowing for the safe connection and disconnection of payloads while the system is powered, and may feature hermetically sealed connectors to maintain the integrity of the pressurized environment within the space vehicle 900.

In some embodiments, the at least one port located on an external surface of the module 905 may include a specialized interface designed to provide controlled access between the internal environment of the module 905 and the external space environment. The port may incorporate a multi-layer hatch system with redundant sealing mechanisms to maintain pressure integrity while allowing for the deployment or retrieval of external payloads, scientific instruments, or robotic systems. The port may feature a standardized berthing mechanism compatible with various external payload adapters. The port may be equipped with electrical and data feed-throughs to support powered external payloads, as well as fluid connectors for potential coolant circulation or propellant transfer operations. The port's design may include micrometeoroid and orbital debris shielding, as well as thermal protection systems to manage heat transfer during extravehicular activities or when exposed to direct solar radiation.

The radial tube 910 may connect the two modules 905 to each other. In some embodiments, the radial tube 910 may include a structural conduit designed to connect each of modules 905 and facilitate the transfer of resources, data, and mechanical loads between modules 905. The radial tube 910 may be constructed using lightweight, high-strength materials such as aluminum-lithium alloys or carbon fiber composites to minimize mass while maintaining structural integrity under the stresses of launch and orbital maneuvers. The interior of radial tube 910 may house a network of fluid lines for propellant transfer, coolant circulation, or pressurized gas distribution, as well as power and data cables protected by electromagnetic shielding to ensure reliable communication between modules 905. Radial tube 910 may incorporate active thermal management systems, such as heat pipes or fluid loops, to regulate temperature gradients across the structure. The radial tube 910 may also feature external mounting points for solar arrays, radiators, or scientific instruments, maximizing the utilization of available surface area.

Space vehicle 900 may further include a power system configured to provide power to each of modules 905 through the respective power connections of each module 905. In some embodiments, the power system may include an integrated network of energy generation, storage, and distribution components designed to meet the diverse power requirements of the payloads within each of module 905 of space vehicle 900. The power system may incorporate high-efficiency multi-junction photovoltaic arrays with sun-tracking capabilities to maximize solar energy capture during orbital operations. The power system may also feature advanced lithium-ion battery banks or regenerative fuel cells for energy storage during eclipse periods or high-demand operations. For long-duration missions, the power system may include a small nuclear power source, such as a radioisotope thermoelectric generator, to provide consistent baseline power.

The distribution network may utilize a combination of high-voltage DC and AC power buses with smart power management units to optimize power allocation and minimize transmission losses across the modules 905. The power system may also incorporate fault detection and isolation mechanisms, as well as redundant power pathways to ensure continuous operation of critical systems in the event of component failures.

Space vehicle 900 may further include an on-platform communication system that may be configured to provide data transmission and control for the payloads in each of modules 905 via the data connections in modules 905. In some embodiments, the on-platform communications system may include a comprehensive network of data transmission, processing, and control infrastructure designed to facilitate seamless communication between all components and payloads within the space vehicle. The communications system may utilize a combination of wired and wireless technologies. The communications system may incorporate radiation-hardened routers and switches capable of managing gigabit-level data rates, with built-in encryption and error correction protocols to ensure secure and reliable data transfer in the harsh space environment. The communications system may feature a distributed architecture with multiple redundant nodes to prevent single points of failure and may employ software-defined networking capabilities for dynamic resource allocation and traffic management. The system may also include a central command and data handling unit that integrates telemetry from various subsystems, processes payload data, and manages the space vehicle's 900 overall operational state. Additionally, the on-platform communications system may support standardized interfaces for payload integration, and may incorporate advanced quality of service mechanisms to prioritize critical command and control traffic over lower-priority data streams.

In some embodiments, space vehicle 900 may further include a thermal control system that may be configured to provide thermal energy transfer to each of modules 905. In some embodiments, the thermal control system may include an integrated network of heat management components designed to regulate the temperature of the space vehicle's 900 modules 905, systems, and payloads within their operational limits. The thermal control system may incorporate both active and passive elements, such as multi-layer insulation blankets, heat pipes, and fluid loops, to efficiently transfer and reject heat. The active thermal control may utilize a mechanically pumped two-phase fluid loop, circulating a working fluid like ammonia or a fluorocarbon through cold plates, heat exchangers, and external radiators to collect and dissipate excess heat from high-power electronics and life support systems. For precise temperature control of sensitive payloads, the system may employ thermoelectric coolers or miniature cryocoolers. Passive thermal control elements may include optical solar reflectors, thermal louvers, and phase change materials strategically placed to manage heat loads from solar radiation and internal heat generation. The thermal control system may also feature a network of temperature sensors and microcontrollers to continuously monitor and adjust thermal conditions throughout the space vehicle 900, with the ability to reconfigure heat flow paths based on changing operational modes or failure scenarios. Additionally, the thermal control system may incorporate advanced thermal management technologies such as variable emissivity coatings or deployable radiators to adapt to varying heat loads and maintain optimal thermal balance throughout different mission phases.

The design of the space vehicle 900 may allow for the creation of different gravity environments within the same structure. By rotating the space vehicle 900 around its central axis, artificial gravity may be generated in the modules 905. In some embodiments, the magnitude of this artificial gravity may be adjusted by altering the rotation speed or by positioning payloads at different distances from the axis of rotation. This configuration of the space vehicle 900 may enable a hybrid gravity environment. In some embodiments, microgravity experiments or operations may be conducted near the center of rotation, while artificial gravity may be provided towards the outer edges of the modules 905 for experimental needs. The configuration of space vehicle 900 may further include a compact and efficient structure for specific mission requirements. The modular nature of the space vehicle 900 may also allow for flexibility in mission design. In some embodiments, additional modules or radial tubes may be added to expand the capabilities of the space vehicle 900, potentially accommodating a wider range of experiments or increasing the useable volume.

FIG. 10 depicts a method 1000 for manufacturing a space vehicle that provides a hybrid gravity environment. The method 1000 may include several steps for manufacturing and assembling various components of the space vehicle.

The method 1000 may begin with a step 1005 of manufacturing a first outer ring module. In some embodiments, the first outer ring module may correspond to outer ring module 105, as disclosed herein with respect to FIG. 1. In some embodiments, the first outer ring module may be designed to produce an artificial gravity environment when revolved around a rotational axis. The manufacturing process may involve creating a structure capable of withstanding the forces generated during rotation while maintaining a pressurized environment for occupants.

A step 1010 may involve manufacturing a second outer ring module. The second outer ring module may be similar in design and function to the first outer ring module. In some embodiments, the second outer ring module may correspond to outer ring module 105, as disclosed herein with respect to FIG. 1. In some embodiments, the manufacturing process for both outer ring modules may be identical to ensure consistency in performance and structural integrity.

The method 1000 may continue with a step 1015 of manufacturing at least one circumferential access tube. The circumferential access tube may be designed to connect adjacent outer ring modules and allow movement between them. For example, the circumferential access tube may correspond to circumferential access tube 110, as disclosed herein with respect to FIG. 1. The manufacturing process may focus on creating a structure that can maintain pressurization while accommodating the stresses of rotation and potential flexing between connected modules.

A step 1020 may involve manufacturing a central hub. The central hub may serve as a core component of the space vehicle and may house critical systems and serve as a connection point for other components. In some embodiments, the central hub may correspond to central hub 120, as disclosed herein with respect to FIG. 1. The manufacturing process may emphasize creating a structure capable of supporting multiple connections and withstanding the forces generated during rotation.

The method 1100 may proceed with a step 1025 of manufacturing a first radial access tube, followed by a step

1030 of manufacturing a second radial access tube. These radial access tubes may be designed to connect the outer ring modules to the central hub. In some embodiments, the first radial access tube and the second radial access tube may correspond to radial access tubes 115, as disclosed herein with respect to FIG. 1. The manufacturing process may focus on creating structures that can accommodate movement between different gravity environments while maintaining structural integrity and pressurization.

A step 1035 may involve manufacturing a microgravity module. The microgravity module may be designed to provide a microgravity environment within the space vehicle. In some embodiments, the microgravity module may correspond to microgravity module 130, as disclosed herein with respect to FIG. 1. The manufacturing process may emphasize creating a structure that can remain stationary relative to the rotating components of the space vehicle.

The method 1000 may continue with a step 1040 of manufacturing a rotary union. The rotary union may be designed to connect the central hub with the microgravity module while allowing differential rotation. In some embodiments, the rotary union may correspond to rotary union 125, as disclosed herein with respect to FIG. 1. The manufacturing process may focus on creating a mechanism that can maintain a seal between rotating and non-rotating components while allowing for the transfer of resources such as power, data, and potentially crew members.

A step 1045 of the method 1000 may involve placing the manufactured components on a vehicle capable of entering outer space. This step may include placing the first outer ring module, the second outer ring module, the at least one circumferential access tube, the central hub, the first radial access tube, the second radial access tube, the microgravity module, and the rotary union on the vehicle. The placement process may involve careful assembly and integration of the components to ensure proper alignment and functionality of the space vehicle. In some embodiments, each component may be placed on the same vehicle. In some embodiments, components may be placed on separate vehicles. In some embodiments, the components are configured to be assembled in outer space to form a space vehicle such as space vehicle 100. Some embodiments involve pre-assembly of some components before placing the components onto the vehicle capable of entering outer space. Some embodiments involve inflating or modifying one or more components, on Earth or in outer space, to prepare the components for operation in outer space.

In some embodiments, the method 1000 may include additional steps for testing and verifying the assembled space vehicle. These steps may involve structural integrity tests, rotation tests, and simulations of various operational scenarios to ensure the space vehicle can provide the intended hybrid gravity environment when deployed in space.

Figure 11:
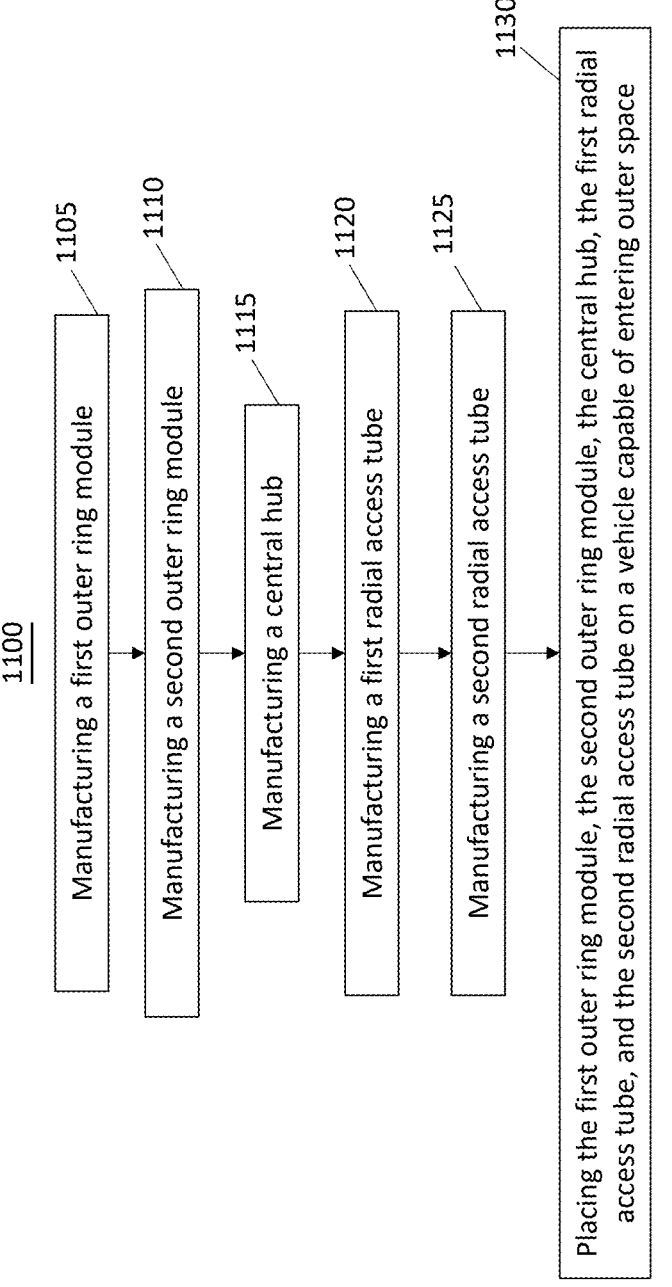
FIG. 11 depicts a flowchart for a method of manufacturing a space vehicle, according to aspects of the present disclosure.

FIG. 11 depicts a method 1100 for manufacturing a space vehicle that provides a hybrid gravity environment. The method 1100 may include several steps for manufacturing and assembling various components of the space vehicle.

The method 1100 may begin with a step 1105 of manufacturing a first outer ring module. In some embodiments, the first outer ring module may correspond to outer ring module 105, as disclosed herein with respect to FIG. 1. In some embodiments, the first outer ring module may be designed to produce an artificial gravity environment when revolved around a rotational axis. The manufacturing process may involve creating a structure capable of withstanding the forces generated during rotation while maintaining a pressurized environment for occupants.

A step 1110 may involve manufacturing a second outer ring module. The second outer ring module may be similar in design and function to the first outer ring module. In some embodiments, the second outer ring module may correspond to outer ring module 105, as disclosed herein with respect to FIG. 1. In some embodiments, the manufacturing process for both outer ring modules may be identical to ensure consistency in performance and structural integrity.

A step 1115 may involve manufacturing a central hub. The central hub may serve as a core component of the space vehicle and may house critical systems and serve as a connection point for other components. In some embodiments, the central hub may correspond to central hub 120, as disclosed herein with respect to FIG. 1. The manufacturing process may emphasize creating a structure capable of supporting multiple connections and withstanding the forces generated during rotation.

The method 1100 may proceed with a step 1120 of manufacturing a first radial access tube, followed by a step 1125 of manufacturing a second radial access tube. These radial access tubes may be designed to connect the outer ring modules to the central hub. In some embodiments, the first radial access tube and the second radial access tube may correspond to radial access tubes 115, as disclosed herein with respect to FIG. 1. The manufacturing process may focus on creating structures that can accommodate movement between different gravity environments while maintaining structural integrity and pressurization.

A step 1130 of the method 1100 may involve placing the manufactured components on a vehicle capable of entering outer space. This step may include placing the first outer ring module, the second outer ring module, the central hub, the first radial access tube, and the second radial access tube on the vehicle. The placement process may involve careful assembly and integration of the components to ensure proper alignment and functionality of the space vehicle. In some embodiments, each component may be placed on the same vehicle. In some embodiments, components may be placed on separate vehicles. In some embodiments, the components are configured to be assembled in outer space to form a space vehicle such as space vehicle 100. Some embodiments involve pre-assembly of some components before placing the components onto the vehicle capable of entering outer space. Some embodiments may involve inflating or modifying one or more components, on Earth or in outer space, to prepare the components for operation in outer space.

In some embodiments, the method 1100 may include additional steps for testing and verifying the assembled space vehicle. These steps may involve structural integrity tests, rotation tests, and simulations of various operational scenarios to ensure the space vehicle can provide the intended hybrid gravity environment when deployed in space.

The foregoing description has been presented for purposes of illustration. It is not exhaustive and is not limited to precise forms or embodiments disclosed. Modifications and adaptations of the embodiments will be apparent from consideration of the specification and practice of the disclosed embodiments. For example, while certain components have been described as being coupled to one another, such components may be integrated with one another or distributed in any suitable fashion.

Moreover, while illustrative embodiments have been described herein, the scope includes any and all embodiments having equivalent elements, modifications, omissions, combinations (e.g., of aspects across various embodiments), adaptations and/or alterations based on the present disclosure. The elements in the claims are to be interpreted broadly based on the language employed in the claims and not limited to examples described in the present specification or during the prosecution of the application, which examples are to be construed as nonexclusive. Further, the steps of the disclosed methods can be modified in any manner, including reordering steps and/or inserting or deleting steps.

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Words such as "and" or "or" mean "and/or" unless specifically directed otherwise. Further, since numerous modifications and variations will readily occur from studying the present disclosure, it is not desired to limit the disclosure to the exact construction and operation illustrated and described, and, accordingly, all suitable modifications and equivalents may be resorted to, falling within the scope of the disclosure.

Other embodiments will be apparent from consideration of the specification and practice of the embodiments disclosed herein. It is intended that the specification and examples be considered as example only, with a true scope and spirit of the disclosed embodiments being indicated by the following claims.

What is claimed is:

1. An apparatus comprising:
a first outer ring module configured to produce a first artificial gravity environment having a first artificial gravity magnitude when revolved about a rotational axis;
a second outer ring module configured to produce a second artificial gravity environment having a second artificial gravity magnitude equivalent to the first artificial gravity magnitude when revolved about the rotational axis;
at least one circumferential access tube configured to connect the first outer ring module to the second outer ring module;
a central hub;
a first radial access tube configured to connect the central hub to the first outer ring module; a second radial access tube configured to connect the central hub to the second outer ring module;
a microgravity module configured to be located coaxial with the rotational axis;
a rotary union configured to connect the microgravity module to the central hub; and
a gyroscope configured to extend from the central hub, wherein the gyroscope includes a cross-piece with a first weighted end and a second weighted end.

2. The apparatus of claim 1, wherein the first outer ring module includes a first weight located on a first edge of the first outer ring module and a second weight located on a second edge of the first outer ring module, and wherein the second outer ring module includes a third weight located on a first edge of the second outer ring module and a fourth weight located on a second edge of the second outer ring module.

3. The apparatus of claim 1, further comprising a third outer ring module configured to produce a third artificial gravity environment having a third artificial gravity magnitude when revolved about the rotational axis.

4. The apparatus of claim 1, wherein the first outer ring module and the second outer ring module are each configured to produce an interior volume of 0.025 to 10,000 m³.

5. The apparatus of claim 1, wherein each of the first outer ring module and the second outer ring module is configured to be located 0.5 meters to 5,000 meters from the central hub.

6. The apparatus of claim 1, wherein the first artificial gravity magnitude and the second artificial gravity magnitude are between about 0.01 g and about 10 g.

7. The apparatus of claim 6, wherein the first artificial gravity magnitude and the second artificial gravity magnitude are about 0.166 g.

8. The apparatus of claim 1, wherein the first radial access tube and the second radial access tube have an internal diameter of 0.001 to 10 meters.

9. The apparatus of claim 1, wherein the at least one circumferential access tube has an internal diameter of 0.001 meters to 10 meters.

10. The apparatus of claim 1, wherein the rotary union includes:

a stator configured to connect to the microgravity module;
a rotor configured to connect to the central hub;
a primary seal configured to maintain the module and hub pressurization while minimizing rotational friction between the microgravity module and the central hub, the seal including at least one of: a compliant polymer material, an organic material, an inorganic material, a metallic material, or a ceramic material;
a secondary seal; and
a bearing, including at least one of: a mechanical bearing, a magnetic bearing, an air bearing, or a pumped fluid bearing.

11. The apparatus of claim 1, wherein the rotary union includes:

a thrust bearing configured to support axial forces in the rotary union.

12. The apparatus of claim 1, further comprising a parallel section configured to connect along the rotational axis with the central hub through a second rotary union, the parallel section including:

a third outer ring module configured to produce a third artificial gravity environment having a third artificial gravity magnitude when revolved about the rotational axis;
a fourth outer ring module configured to produce a fourth artificial gravity environment having a fourth artificial gravity magnitude equivalent to the third artificial gravity magnitude when revolved about the rotational axis;
at least one secondary circumferential access tube configured to connect the third outer ring module to the fourth outer ring module;
a second central hub configured to connect to the central hub through the second rotary union;
a third radial access tube configured to connect the second central hub to the third outer ring module; and
a fourth radial access tube configured to connect the second central hub to the fourth outer ring module.

13. An apparatus comprising:

a first outer ring module configured to produce a first artificial gravity environment having a first artificial gravity magnitude when revolved about a rotational axis;

a second outer ring module configured to produce a second artificial gravity environment having a second artificial gravity magnitude equivalent to the first artificial gravity magnitude when revolved about the rotational axis;
at least one circumferential access tube configured to connect the first outer ring module to the second outer ring module;
a central hub;
a first radial access tube configured to connect the central hub to the first outer ring module; a second radial access tube configured to connect the central hub to the second outer ring module;
a microgravity module configured to be located coaxial with the rotational axis;
a rotary union configured to connect the microgravity module to the central hub; and
a fluid pumping system, wherein the fluid pumping system includes one or more fluid reservoir, one or more pump, one or more automated sensor, and one or more response system, and wherein the fluid pumping system is configured to move a fluid between the first outer ring module and the second outer ring module to align a center of mass of the apparatus with the rotational axis.

14. An apparatus comprising:

a first module configured to produce a first artificial gravity environment having a first artificial gravity magnitude when revolved about a rotational axis, the first module including:
a first plurality of payload compartments configured to contain a first plurality of payloads, the first plurality of payload compartments including:
a first mounting rail configured to secure the first plurality of payloads,
a first power connection;
a first data connection; and
a first port located on an external surface of the first module, the first port configured to allow at least one of the first plurality of payloads to access an outside environment;
a second module configured to produce a second artificial gravity environment having a second artificial gravity magnitude equivalent to the first artificial gravity magnitude when revolved about the rotational axis, the second module including:
a second plurality of payload compartments configured to contain a second plurality of payloads, the second plurality of payload compartments including:
a second mounting rail configured to secure the second plurality of payloads;
a second power connection;
a second data connection; and
a second port located on an external surface of the second module, the second port configured to allow at least one of the second plurality of payloads to access the outside environment;
a radial tube configured to connect the first module to the second module;
a power system configured to provide power to the first module via the first power connection and configured to provide power to the second module via the second power connection;
an on-platform communications system configured to provide data transmission and control for the first plurality of payloads via the first data connection and configured to provide data transmission and control for the second plurality of payloads via the second data connection; and a thermal control system configured to provide thermal energy transfer to the first module and the second module.

15. The apparatus of claim 14, wherein the first module and the second module are each configured to produce a volume of about 0.001 m$^3$ to about 1,000 m$^3$.

16. The apparatus of claim 14 wherein the first module and the second module are configured to be unpressurized.

17. The apparatus of claim 14, wherein the first module and the second module are configured to be pressurized.

18. The apparatus of claim 14, wherein the first artificial gravity gradient is configured to increase based on a distance from the rotational axis.

19. The apparatus of claim 14, wherein a first artificial gravity magnitude at an outer edge of the first module is configured to be greater than a second artificial gravity magnitude at an inner edge of the first module.

20. The apparatus of claim 19, wherein the second artificial gravity magnitude is configured to be approximately seventy percent of the first artificial gravity magnitude.

21. The apparatus of claim 19, wherein the first artificial gravity magnitude is configured to be between 0.006 g and 0.180 g.

22. The apparatus of claim 19, wherein the second artificial gravity magnitude is configured to be between 0.004 g and 0.12 g.

* * * * *